(12) United States Patent
Toyoda

(10) Patent No.: US 6,215,574 B1
(45) Date of Patent: Apr. 10, 2001

(54) SCANNING OPTICAL DEVICE AND MULTI-BEAM SCANNING OPTICAL DEVICE

(75) Inventor: Koji Toyoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/330,025

(22) Filed: Jun. 11, 1999

(30) Foreign Application Priority Data

Jun. 12, 1998 (JP) .................................................. 10-181699

(51) Int. Cl.$^7$ .................................................. G02B 26/08
(52) U.S. Cl. ........................... 359/207; 359/205; 359/206; 359/216; 359/204
(58) Field of Search .................................. 359/212–219, 359/204–207, 19, 558, 566

(56) References Cited

U.S. PATENT DOCUMENTS 5,838,480 * 11/1998 McIntyre et al. .................... 359/205

FOREIGN PATENT DOCUMENTS 10-68903    3/1998 (JP) .

* cited by examiner

Primary Examiner—James Phan
(74) Attorney, Agent, or Firm—Fitzpatrick, Cella, Harper & Scinto

(57) ABSTRACT

A scanning optical device used for a laser beam printer, a digital copying apparatus or the like, includes a light source for emitting light beam, deflector for deflecting light beam emitted from the light source toward a surface to be scanned, and a scanning optical system for forming a spot of the light beam deflected by the deflector on the surface to be scanned. The scanning optical system has a plurality of optical elements. A diffraction optical element is formed on a curved surface of at least one of the plurality of optical elements.

13 Claims, 23 Drawing Sheets

PHASE AMOUNT

PITCH

PHASE AMOUNT

PITCH

PHASE AMOUNT

PITCH

FIG. 29 fθ CHARACTERISTIC

CHROMATIC ABERRATION OF MAGNIFICATION

IMAGE HEIGHT (mm)

SCANNING OPTICAL DEVICE AND MULTI-BEAM SCANNING OPTICAL DEVICE

BACKGROUND OF THE INVENTION

1. Field of the Invention

The present invention relates to a scanning optical device and a multi-beam scanning optical device and, more particularly, to a device suitably used for a laser beam printer, a digital copying machine, and the like, in which a light beam emitted from a light source means is guided onto a surface to be scanned as a recording medium surface through a light deflector such as a rotating polygonal mirror, and the light beam is scanned on the scanned surface, thereby recording information such as characters.

2. Related Background Art

In a conventional scanning optical device used for laser beam printer, a digital copying machine, and the like, a light beam emitted from a light source means is deflected by a deflection means, and the deflected light beam forms a spot on a photosensitive drum surface as a scanned surface via a scanning optical means, thereby scanning the light beam on the scanned surface.

Recently, to meet demands for reductions in cost and size, a scanning optical means using a plastic lens made of a plastic material has been widely used as a scanning optical means in a scanning optical device of this type. However, the refractive index of the plastic lens changes with changes in a use environment (temperature change, in particular). For this reason, in a scanning optical device using a plastic lens, focus changes, magnification changes, and the like occur in the main scanning direction due to environmental variations.

To solve this problem, in the scanning optical device disclosed in Japanese Patent Application Laid-Open No. 10-68903, a diffraction optical element is formed on the lens surface to correct focus changes, magnification changes, and the like in the main scanning direction with changes in the temperature of the scanning optical device by using power changes in the refraction and diffraction units of the scanning optical means and wavelength variations in the semiconductor laser as a light source means.

FIG. 1 is a sectional view (main scanning cross-section) of the main part of the scanning optical device in the above reference in the main scanning direction. Referring to FIG. 1, a light beam emitted from a light source means 11 constituted by a semiconductor laser and the like is converted into a substantially collimated light beam by a collimator lens 12. This substantially collimated light beam is shaped into an optimal beam shape by an aperture stop 13 and strikes a cylindrical lens 14. The cylindrical lens 14 has a power in the sub-scanning direction and forms a light beam image elongated in the main scanning direction near a deflection surface 15a of the light deflector 15 constituted by a rotating polygonal mirror and the like. In this case, the main scanning direction is a direction perpendicular to the deflection scanning direction, and the sub-scanning direction is a direction perpendicular to the deflection scanning direction. This applies to the following description. The light beam is reflected/deflected by the light deflector 15 at an equal angular velocity to form a spot on a photosensitive drum surface (recording medium surface) 17 as a scanned surface via an fθ lens 16 which is a single element lens serving as a scanning optical means having an fθ characteristic. This light beam is scanned on the photosensitive drum surface 17 at an equal velocity.

According to this reference, a diffraction optical element 18 is formed on that surface of the fθ lens 16 which is located on the scanned surface 17 side to correct focus changes, magnification changes, and the like in the main scanning direction, which may occur with variations in the temperature of the scanning optical device, by using power changes in the refraction and diffraction units of the scanning optical means 16 and wavelength variations in the semiconductor laser 11 as the light source means.

According to this reference, since a single element lens is used for the scanning optical means, the degree of freedom in aberration correction is low. This tends to pose difficulty in meeting the requirement for an increase in resolution. FIG. 2 shows the comatic aberration of a full-pupil light beam in the main scanning direction in the scanning optical means according to the first embodiment in the reference as an example of this case. Referring to FIG. 2, the abscissa represents the image height (unit: mm); and the ordinate, the comatic aberration (unit: wavelength λ). In this case, as comatic aberration, the value obtained by dividing the difference between ± full-pupil wavefront aberrations in the main scanning cross-section by 2 is used, and its asymmetrical component is evaluated. In this case, the spot diameter in the main scanning direction is set to 80 μm. As is obvious from FIG. 2, a comatic aberration of about 0.12 λ occurs at the middle image height.

In general, when a comatic aberration of 0.1 λ or more occurs, the formation of side lobe becomes conspicuous in the main scanning direction. As a result, an appropriate spot shape cannot be obtained, affecting the printed image. If the spot diameter is reduced to increase the resolution, the comatic aberration abruptly increases to disturb the spot shape.

In addition, when the spot diameter is further reduced in the sub-scanning direction as well to increase the resolution, the occurrence of wavefront aberration becomes noticeable, disturbing the spot shape. In general, to correct tilt in a scanning optical means, a light beam is temporarily imaged in the sub-scanning direction near the deflection surface of a deflection means to set the deflection surface and the scanned surface conjugate with each other. For this reason, since the power in the sub-scanning direction is larger than that in the main scanning direction, large focus changes occur with environmental variations. When the spot shape is reduced to increase the resolution, the depth of focus decreases. As a consequence, the spot diameter in the sub-scanning direction greatly changes with a focus change.

Recently, to meet the demand for an increase in speed, various multi-beam scanning optical devices for scanning a plurality of light beams on a scanned surface have been proposed.

When, however, the respective light beams differ in wavelength, since the fθ characteristic varies with wavelength, chromatic aberration of magnification occurs. For this reason, the scanning length on the scanned surface varies depending on the respective light beams. Even if, therefore, the start positions of the respective light beams in write operation are aligned with each other, the end positions in the write operation differ from each other, causing jitter in the image formed.

In consideration of processability a diffraction optical element is preferably formed on a flat surface. In this case, however, since the degree of freedom in aberration correction decreases, it is difficult to obtain good optical performance. This arrangement greatly influences the partial magnification or fθ characteristics which can be properly corrected by using an aspherical shape. As a consequence, for example, the number of lenses increases, and the lens size increases.

SUMMARY OF THE INVENTION

It is the first object of the present invention to provide a compact scanning optical device which is resistant to focus changes due to environmental variations (temperature changes) and is capable of high-resolution printing with a simple arrangement by forming a diffraction optical element on a curved surface of at least one of a plurality of optical elements constructing a scanning optical means.

It is the second object of the present invention to provide a compact multi-beam scanning optical device which is resistant to focus changes due to environmental variations (temperature changes) and is capable of high-resolution printing with a simple arrangement by forming a diffraction optical element on a curved surface of at least one of a plurality of optical elements constructing a scanning optical means.

According to the present invention, there is provided a scanning optical device in which a light beam emitted from a light source means is guided to a deflection means, and the light beam deflected by the deflection means forms a spot on a scanned surface via a scanning optical means to scan the light on the scanned surface, characterized in that the scanning optical means has a plurality of optical elements, and a diffraction optical element is formed on a curved surface of at least one of the optical elements.

The diffraction optical element, in particular, is characterized by, for example, having a positive power in the sub-scanning direction, having a positive power in the main scanning direction, having different positive powers in the main scanning direction and the sub-scanning direction, functioning to cancel out an aberration variation in the scanning optical means, caused by an environmental variation in the device, by using a wavelength variation in the light source means which is caused by the environmental variation, or being formed on that surface of the optical element which is located on the scanned surface side.

According to the present invention, there is provided a multi-beam scanning optical device in which a plurality of light beams emitted from a light source means having a plurality of light-emitting units are guided to a deflection means, and the plurality of light beams deflected by the deflection means form spots on a scanned surface via a scanning optical means to simultaneously scan the plurality of light beams on the scanned surface, characterized in that the scanning optical means has a plurality of optical elements, and a diffraction optical element is formed on a curved surface of at least one of the optical elements.

The diffraction optical element, in particular, is characterized by, for example, having a positive power in the sub-scanning direction, having a positive power in the main scanning direction, having different positive powers in the main scanning direction and the sub-scanning direction, functioning to cancel out an aberration variation in the scanning optical means, caused by an environmental variation in the device, by using a wavelength variation in the light source means which is caused by the environmental variation, functioning to cancel out an aberration variation in the scanning optical means which is caused by a difference between oscillation wavelengths of the light source means having the plurality of light-emitting units, or being formed on that surface of the optical element which is located on the scanned surface side.

DETAILED DESCRIPTION OF THE PREFERRED EMBODIMENTS

Figure 1:
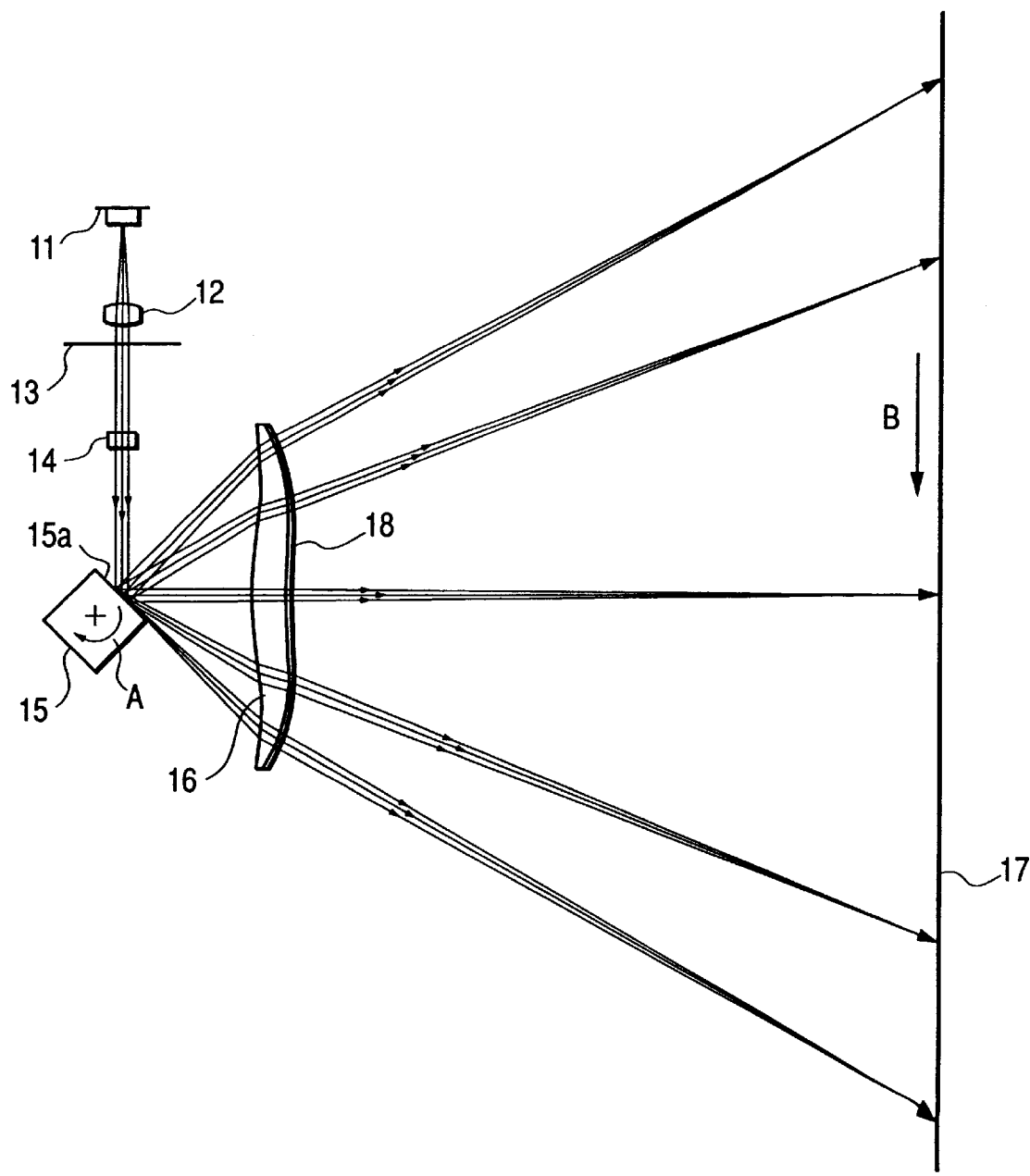
FIG. 1 is a sectional view (main scanning cross-section) of the main part of a conventional scanning optical device in the main scanning direction.
Figure 2:
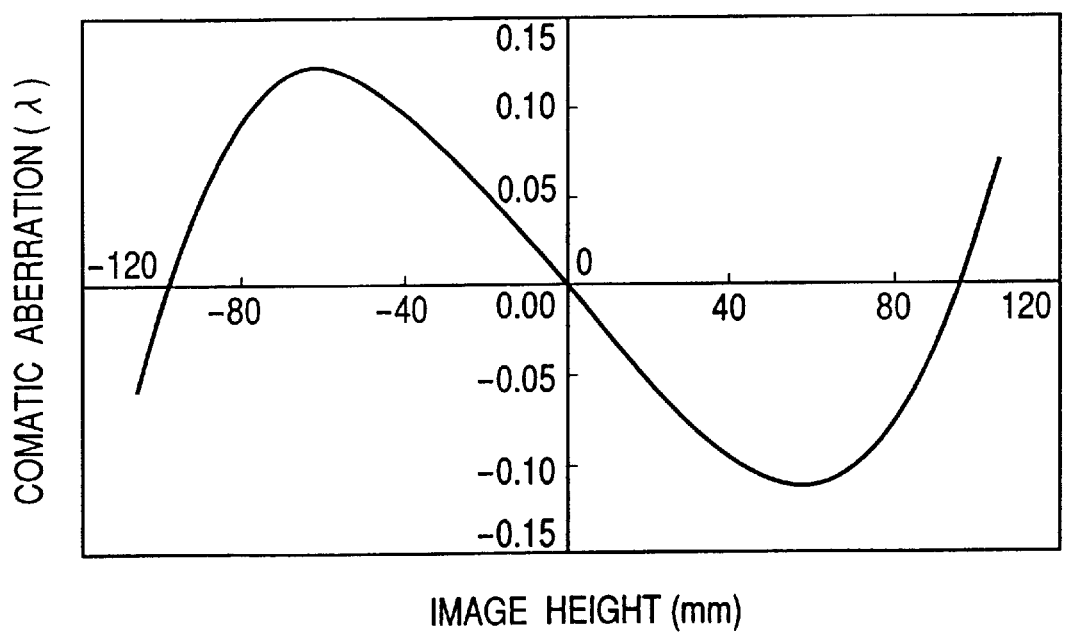
FIG. 2 is a graph showing the comatic aberration in the main scanning direction in the conventional scanning optical device.
Figure 3:
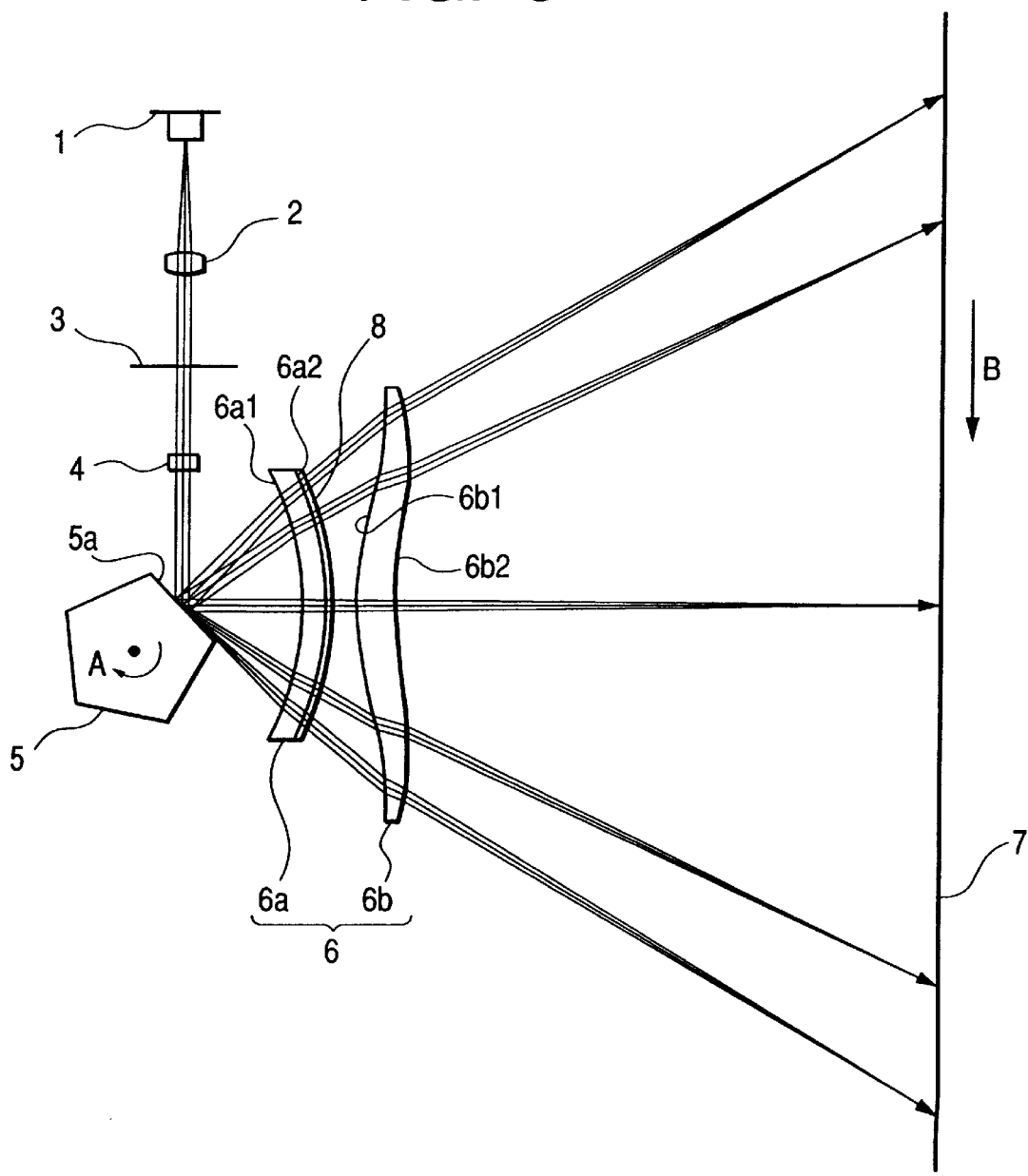
FIG. 3 is a sectional view (main scanning cross-section) of the main part of the first embodiment of the present invention in the main scanning direction.

FIG. 3 is a sectional view (main scanning sectional view) of the main part of a scanning optical device according to the first embodiment of the present invention in the main scanning direction.

Referring to FIG. 3, as a light source means 1, for example, a semiconductor laser is used. A collimator lens 2 converts a divergent light beam emitted from the light source means 1 into a convergent light beam. An aperture stop 3 forms the light beam emerging from the collimator lens 2 into a desired optimal beam shape. A cylindrical lens 4 has a predetermined power (refracting power) in the sub-scanning direction perpendicular to the drawing surface and forms the light beam emerging from the aperture stop 3 into an image (a linear image elongated in the main scanning cross-section) within the sub-scanning cross-section near a position above a deflection surface 5a of a deflection means 5 (to be described later). The deflection means 5 serves as a light deflector. For example, as the deflection means 5, a rotating polygonal mirror is used, which is rotated by a driving means (not shown) such as a motor at a constant speed in the direction indicated by an arrow A.

A scanning optical means 6 has an fθ characteristic and includes first and second optical elements (fθ lens system) 6a and 6b. The first optical element 6a has a first surface (incident surface) 6a1 and a second surface (exit surface) 6a2, both of which are spherical surfaces exhibiting positive (convex) powers toward the scanned surface side. A diffraction optical element 8 is formed on the second surface 6a2 such that the powers based on the diffraction system become different positive (convex) powers in the main scanning direction and the sub-scanning direction. The second optical element 6b is an anamorphic lens having different positive (convex) powers in the main scanning direction and the sub-scanning direction. Both a first surface (incident surface) 6b1 and a second (exit surface) 6b2 are toric surfaces. In the main scanning direction, both the first and second surfaces 6b1 and 6b2 are aspherical. In the sub-scanning direction, both the first and second surfaces 6b1 and 6b2 continuously change in radius of curvature with distance from the optical axis. Both the first and second optical elements 6a and 6b are made of a plastic material. The scanning optical means 6 has a tilt correction function implemented by setting the deflection surface 5a and a scanned surface 7 optically conjugate with each other within the sub-scanning cross-section. A scanned surface 7 is a photosensitive drum surface (recording medium surface).

In this embodiment, the divergent light beam emitted from the light source means 1 is converted into a convergent light beam by the collimator lens 2. The light beam is then shaped into a desired beam shape by the aperture stop 3 and strikes the cylindrical lens 4. The light beam incident on the cylindrical lens 4 exits without any change within the main scanning cross-section. On the other hand, the light beam converges within the sub-scanning cross-section to form a substantially linear image (a linear image elongated in the main scanning direction) on the deflection surface 5a of the deflection means 5. The light beam reflected/deflected by the deflection surface 5a of the deflection means 5 forms a spot on the photosensitive drum surface 7 via the scanning optical means 6. By rotating the deflection means 5 in the direction indicated by the arrow A, this light beam is scanned on the photosensitive drum surface 7 at a constant speed in the direction indicated by an arrow B (main scanning direction). With this operation, an image is recorded on the photosensitive drum surface 7 as a recording medium.

The shapes of the refraction and diffraction systems of the first and second optical elements 6a and 6b forming the scanning optical means 6 in this embodiment can be respectively expressed as follows, provided that the intersection between each optical element surface and the optical axis is regarded as an origin, and the optical axis direction, the direction perpendicular to the optical axis within the main scanning cross-section, and the direction perpendicular to the optical axis within the sub-scanning cross-section respectively correspond to the X-axis, the Y-axis, and the Z-axis.

(1) The refraction system in the main scanning direction: an aspherical shape expressed by a function up to a 10th-order function:

$$X = \frac{Y^2/R}{1+(1-(1+K)(Y/R)^2)^{1/2}} + B_4 Y^4 + B_6 Y^6 + B_8 Y^8 + B_{10} Y^{10}$$

where R is the radius of curvature, and k, $B_4$, $B_6$, $B_8$, and $B_{10}$ are aspherical coefficients (when subscript "u" is attached to a coefficient, it indicates the laser side with respect to the optical axis, whereas when subscript "l" is attached to a coefficient, it indicates the opposite side to the laser side with respect to the optical axis)

in the sub-scanning direction: a spherical shape whose radius of curvature continuously changes in the Y-axis direction:

$$r' = r(1+D_2 Y^2 + D_4 Y^4 + D_6 Y^6 + D_8 Y^8 + D_{10} Y^{10})$$

where r is the radius of curvature, and $D_2$, $D_4$, $D_6$, $D_8$, and $D_{10}$ are aspherical coefficients (when subscript "u" is attached to a coefficient, it indicates the laser side with respect to the optical axis, whereas when subscript "l" is attached to a coefficient, it indicates the opposite side to the laser side with respect to the optical axis).

(2) The diffraction system: a diffraction surface expressed by a phase function of power polynomial up to a 10th-order polynomial in Y and Z:

$$W = C_1Y + C_2Y^2 + C_3Y^3 + C_4Y^4 + C_5Y^5 + C_6Y^6$$
$$+ C_7Y^7 + C_8Y^8 + C_9Y^9 + C_{10}Y^{10}$$
$$+ E_1Z^2 + E_2YZ^2 + E_3Y^2Z^2 + E_4Y^3Z^2 + E_5Y^4Z^2$$
$$+ E_6Y^5Z^2 + E_7Y^6Z^2 + E_8Y^7Z^2 + E_9Y^8Z^2$$

where $C_1$ to $C_{10}$ and $E_1$ to $E_9$ are phase coefficients.

Table-1 shows an optical configuration in the first embodiment. Table-2 shows the aspherical coefficients of the refraction system and the phase coefficients of the diffraction system.

In this case, $\theta 1$ represents the angle defined by the optical axes of the optical systems respectively located before and after the deflection means; $\theta$max, the angle defined by a light beam and the optical axis of the scanning optical means when the light beam scans the outermost off-axis position; f, the constant provided with $Y=f\theta$ where Y is the image height and $\theta$ is the scanning angle.

Figure 4:
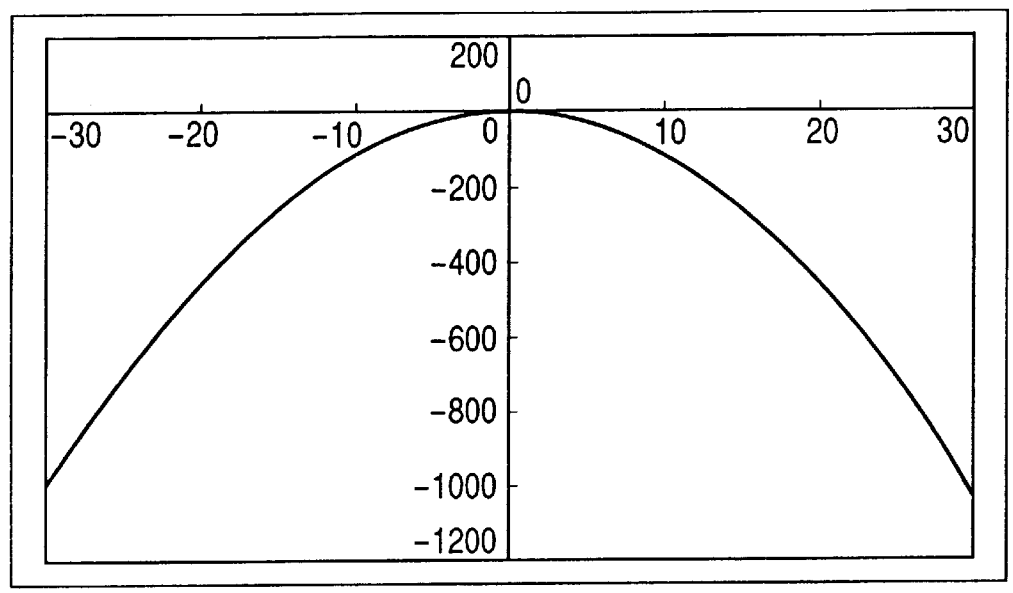
FIG. 4 is a graph showing the phase amount of the diffraction system of the first optical element of the first embodiment of the present invention.
Figure 5:
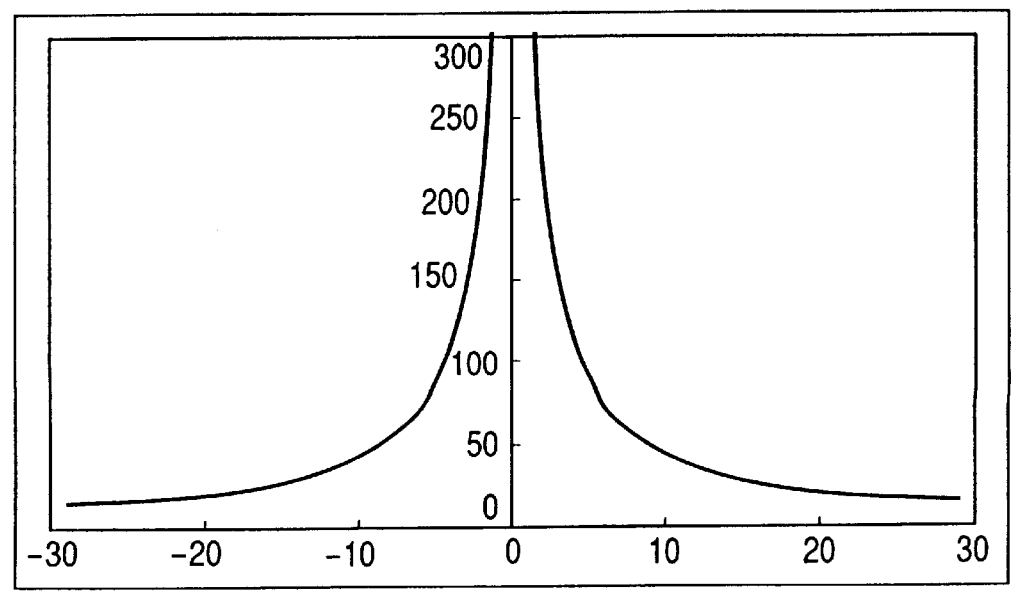
FIG. 5 is a graph showing the pitch of the diffraction grating of the first optical element of the first embodiment of the present invention.
Figure 6:
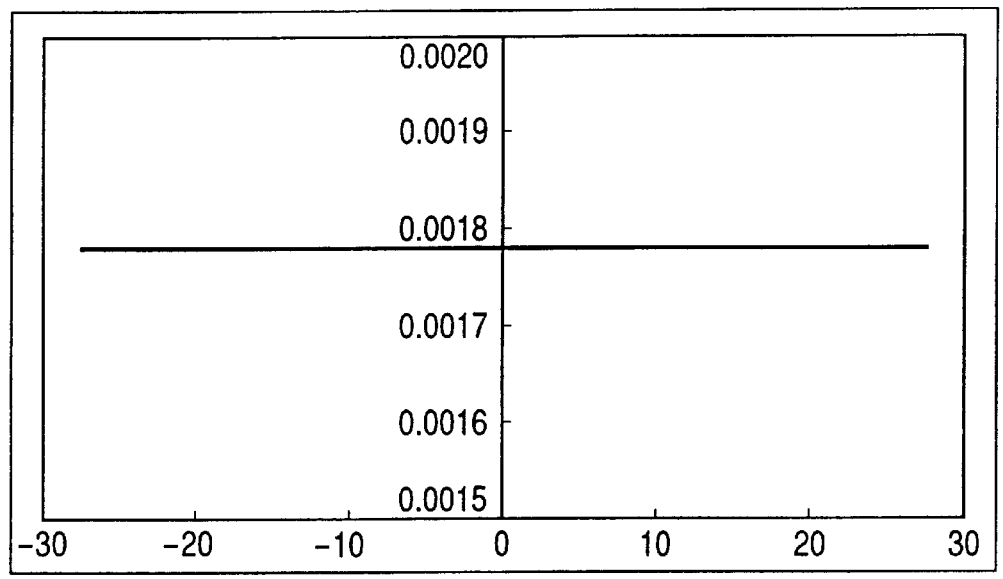
FIG. 6 is a graph showing the diffraction power of the first optical element of the first embodiment of the present invention in the main scanning direction.
Figure 7:
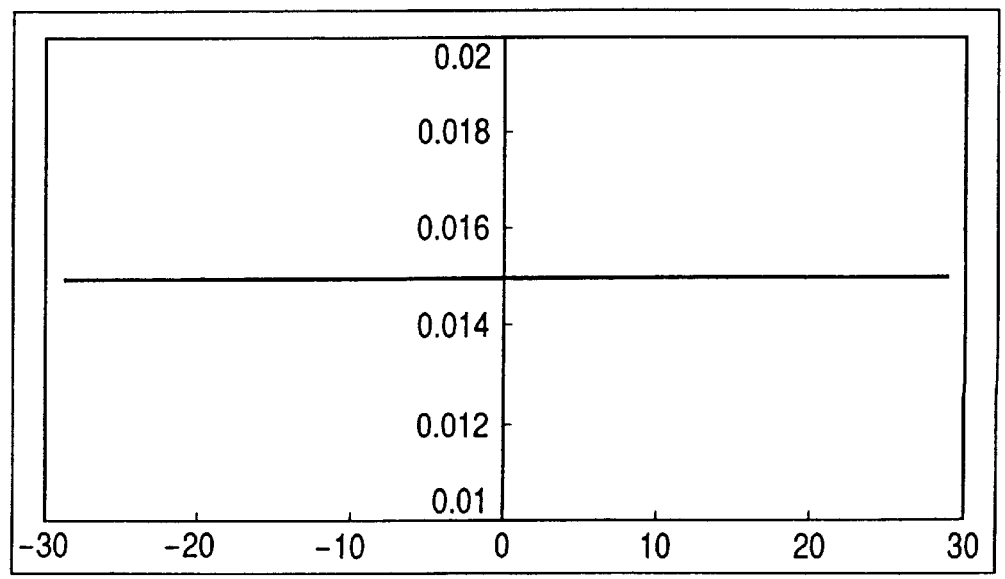
FIG. 7 is a graph showing the diffraction power of the first optical element of the first embodiment of the present invention in the sub-scanning direction.

Each of FIGS. 4, 5, 6, and 7 shows the state of the diffraction optical element 8 at the second surface 6a2 of the first optical element 6a. Referring to each drawing, the abscissa represents the y coordinate on the diffraction optical element 8. FIG. 4 shows the phase amount (unit: $\lambda$) within the main scanning cross-section. FIG. 5 shows the pitch (unit: $\lambda$m) of the diffraction grating with 1st-order diffracted light within the main scanning cross-section. FIG. 6 shows the power in the main scanning direction. FIG. 7 shows the power in the sub-scanning direction.

TABLE 1

| Wavelength Used | $\lambda$(nm) | 780 |
|---|---|---|
| Refractive Index of First Optical Element | n1 | 1.5242 |
| Refractive Index of Second Optical Element | n2 | 1.5242 |
| Angle Defined Between Optical Axes of Optical Systems Before and After Deflection Means | $\theta 1$(deg) | 90 |
| One-side Maximum Scanning Angle | $\theta$max(deg) | 45 |
| Distance between Deflection Surface and First Optical Element | d1(mm) | 25.00 |
| Central Thickness of First Optical Element | d2(mm) | 5.60 |
| Distance between First and Second Optical Elements | d3(mm) | 5.40 |
| Central thickness of Second Optical Element | d4(mm) | 8.00 |
| Distance between Second Optical Element and Scanned Surface | d5(mm) | 113.50 |
| f$\theta$ Coefficient | f | 136 |
| Deflection Means (Rotating Polygonal Mirror) | $\phi$20, 4 surfaces | |

TABLE 2

Shape of Refraction System

| | First Optical Element | | Second Optical Element | |
|---|---|---|---|---|
| | First Surface | Second Surface | First Surface | Second Surface |
| R | −63.66 | −69.19 | 49.35 | 65.22 |
| Ku | 0 | 0 | −1.18E + 01 | −2.32E + 01 |
| B4u | 0 | 0 | −1.17E − 06 | −2.01E − 06 |
| B6u | 0 | 0 | 2.85E − 10 | 5.39E − 10 |
| B8u | 0 | 0 | −1.72E − 13 | −2.18E − 13 |
| B10u | 0 | 0 | 3.21E − 17 | 1.83E − 17 |
| K1 | 0 | 0 | −1.18E + 01 | −2.32E + 01 |
| B41 | 0 | 0 | −1.17E − 06 | −2.01E − 06 |
| B61 | 0 | 0 | 2.85E − 10 | 5.39E − 10 |
| B81 | 0 | 0 | −1.72E − 13 | −2.18E − 13 |
| B101 | 0 | 0 | 3.21E − 17 | 1.83E − 17 |
| r | −63.66 | −69.19 | −79.67 | −18.22 |
| D2u | 0 | 0 | 4.88E − 03 | 1.34E − 03 |
| D4u | 0 | 0 | 1.09E − 05 | −1.17E − 06 |
| D6u | 0 | 0 | −2.12E − 08 | −6.20E − 10 |
| D8u | 0 | 0 | −1.75E − 11 | 1.36E − 12 |
| D10u | 0 | 0 | 2.60E − 14 | −4.62E − 16 |
| D21 | 0 | 0 | 4.88E − 03 | 1.34E − 03 |
| D41 | 0 | 0 | 1.09E − 05 | −1.17E − 06 |
| D61 | 0 | 0 | −2.12E − 08 | −6.20E − 10 |
| D81 | 0 | 0 | −1.75E − 11 | 1.36E − 12 |
| D101 | 0 | 0 | 2.60E − 14 | −4.62E − 16 |

Shape of Diffraction System

| | First Optical Element | | Second Optical Element | |
|---|---|---|---|---|
| | First Surface | Second Surface | First Surface | Second Surface |
| C1 | 0 | 0 | 0 | 0 |
| C2 | 0 | −8.91E − 04 | 0 | 0 |
| C3 | 0 | 0 | 0 | 0 |
| C4 | 0 | 0 | 0 | 0 |
| C5 | 0 | 0 | 0 | 0 |
| C6 | 0 | 0 | 0 | 0 |
| C7 | 0 | 0 | 0 | 0 |
| C8 | 0 | 0 | 0 | 0 |
| C9 | 0 | 0 | 0 | 0 |
| C10 | 0 | 0 | 0 | 0 |
| E1 | 0 | −7.81E − 03 | 0 | 0 |
| E2 | 0 | 0 | 0 | 0 |
| E3 | 0 | 0 | 0 | 0 |
| E4 | 0 | 0 | 0 | 0 |
| E5 | 0 | 0 | 0 | 0 |
| E6 | 0 | 0 | 0 | 0 |
| E7 | 0 | 0 | 0 | 0 |
| E8 | 0 | 0 | 0 | 0 |
| E9 | 0 | 0 | 0 | 0 |

As is obvious from FIGS. 6 and 7, in this embodiment, the powers of the diffraction system are set to desired positive (convex) powers in both the main scanning direction and the sub-scanning direction. By setting the powers of the diffraction system to the desired positive (convex) powers, a focus shift (aberration variation) resulting from a change in the refractive index of the lens material of the scanning optical means 6 due to environmental variations can be corrected by a change in diffraction power owing to variations in the wavelength of the light source means 1. More specifically, when the temperature rises, the refractive index of the plastic material decreases, and hence the focal point moves away from the scanning optical means 6. At this time, however, since the wavelength of the light source means 1 as a light source means shifts to the long wave side, the positive (convex) power of the diffraction system increases to change the focal point toward the scanning optical means 6. As a consequence, focus changes cancel out each other in the overall scanning optical device to have a temperature compensation effect.

Figure 8:
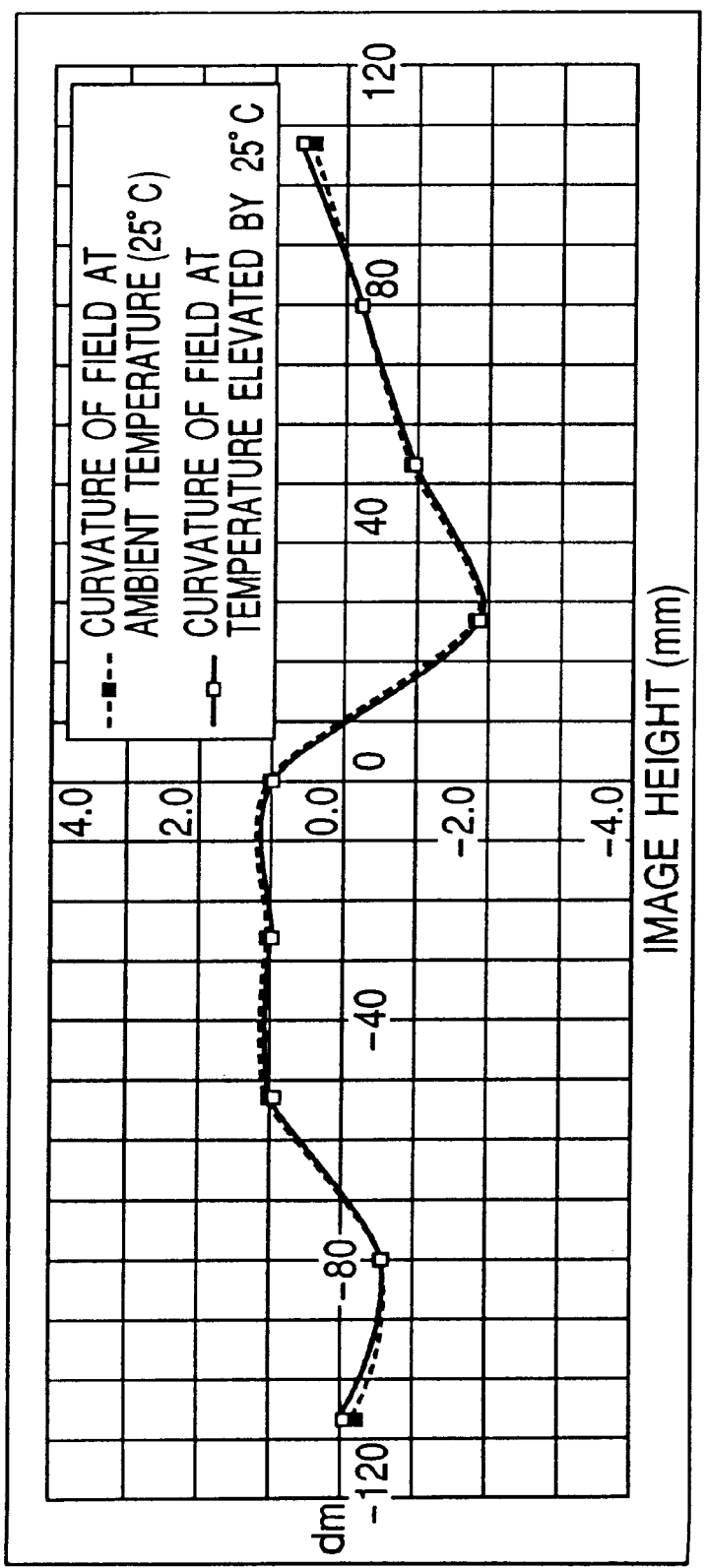
FIG. 8 is a graph showing the curvature of field in the main scanning direction before and after a rise in temperature in the first embodiment of the present invention.
Figure 9:
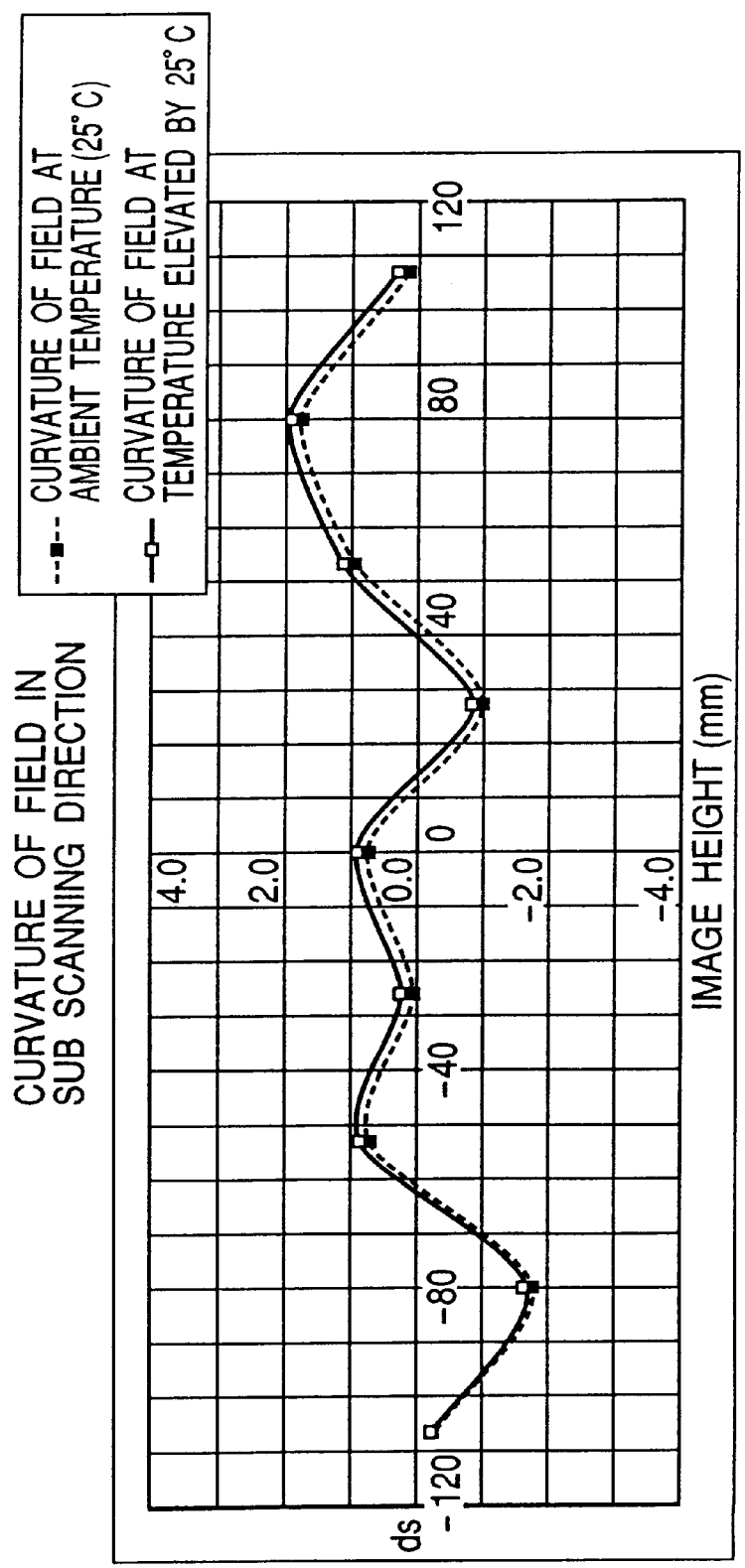
FIG. 9 is a graph showing the curvature of field in the sub-scanning direction before and after a rise in temperature in the first embodiment of the present invention.
Figure 10:
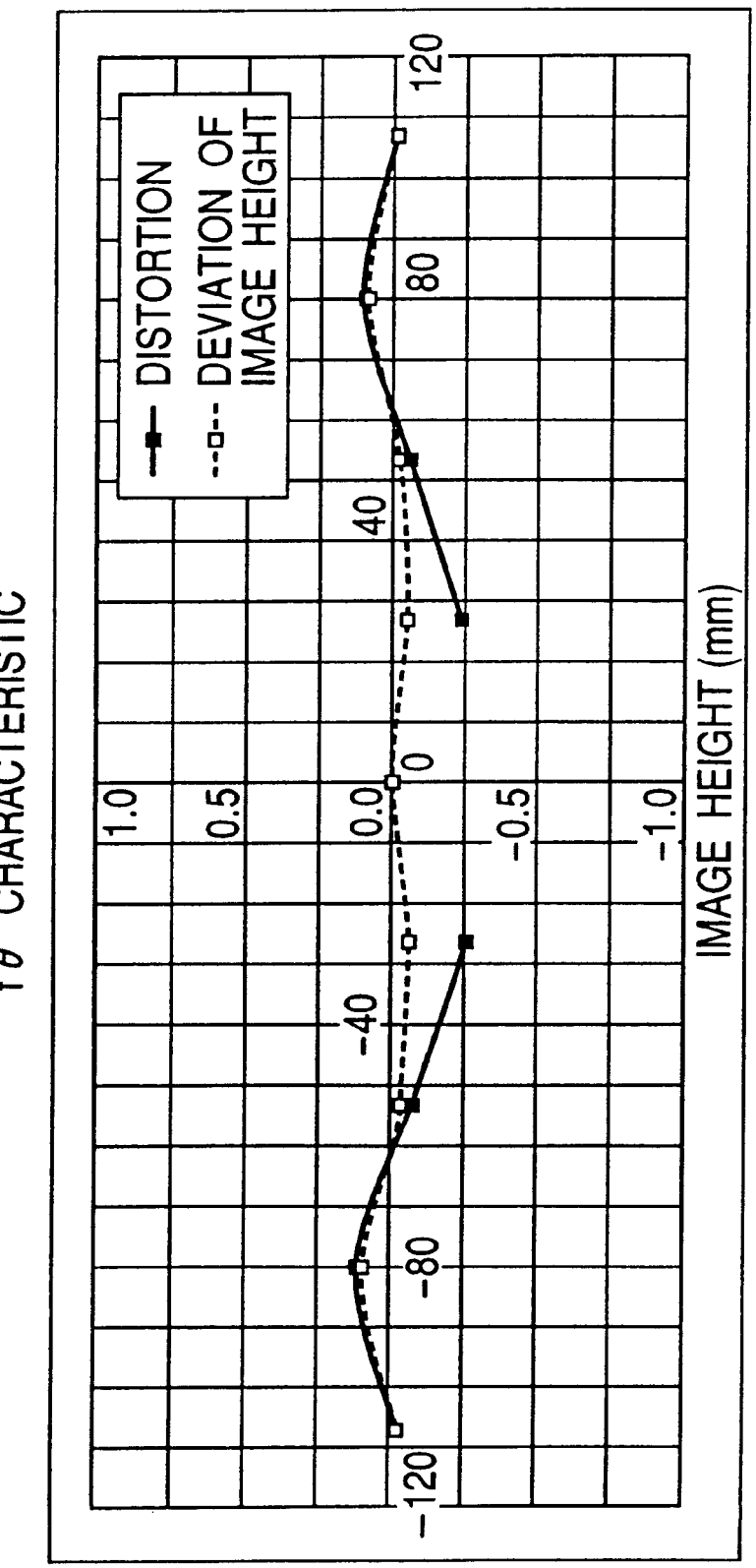
FIG. 10 is a graph showing the distortion (fe characteristic) and the deviation of image height in the first embodiment of the present invention.

FIG. 8 shows the curvature of field in the main scanning direction before and after a rise in temperature in this embodiment. FIG. 9 shows the curvature of field in the sub-scanning direction before and after the rise in temperature in this embodiment. FIG. 10 shows the distortion (f$\theta$ characteristic) and the deviation of image height in this embodiment. Referring to each of FIGS. 8 and 9, the dotted line represents the curvature of field at a room temperature of 25° C.; and the solid line, the curvature of field when the temperatures rises from 25° C. to 50° C. In this case, a refractive index n* of the first and second optical elements 6a and 6b and a wavelength λ* of the light source means 1 are respectively set as:

n*=1.5221

λ*=786.4 nm

As is obvious from FIGS. 8 and 9, the focus shifts both in the main scanning direction and the sub-scanning direction are properly corrected.

Figure 11:
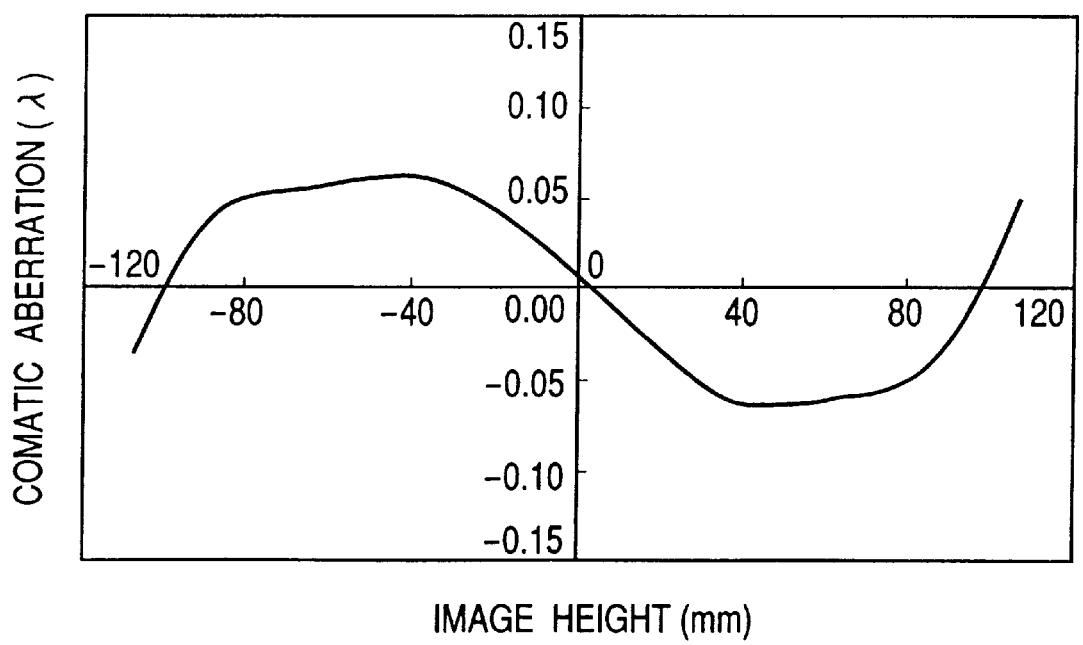
FIG. 11 is a graph showing the comatic aberration in the main scanning direction in the first embodiment of the present invention.

In this embodiment, since the scanning optical means 6 is made up of two lenses, comatic aberration in the main scanning direction can be properly corrected. FIG. 11 shows the comatic aberration (unit: wavelength λ; abscissa: image height) of a full-pupil light beam at each image height with a spot diameter of 80 μm. At the middle image height at which the aberration increases to a maximum, the aberration is about 0.06 λ. The spot diameter can therefore be further reduced.

In addition, in this embodiment, the diffraction optical element 8 is formed on the second surface 6a2 as the exit side of the first optical element 6a. This arrangement aims at suppressing the incident angle (angle θi in FIG. 12) low with respect to the diffraction optical element (diffraction optical surface) within the main scanning cross-section. For example, as the incident angle increases, diffracted light components of orders other than the order used increase in intensity, resulting in a decrease in diffraction efficiency and troubles such as flare due to diffracted light components of orders other than the order used. Such troubles can be reduced by forming a diffraction optical surface on the second surface 6a2.

Figure 12:
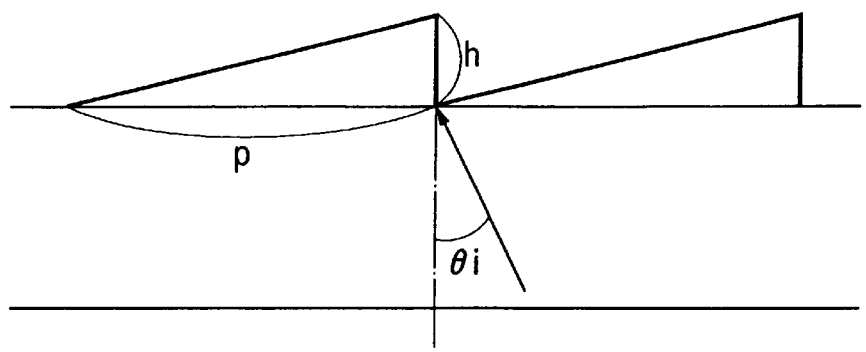
FIG. 12 is a view showing the shape of a diffraction grating.

In this embodiment, the diffraction grating shown in FIG. 12 is a blazed diffraction grating in a sawtooth form. However, a binary diffraction grating formed by a stepped diffraction grating may be used. Letting P be the grating pitch, h be the grating height, and n be the refractive index in FIG. 12, $$h=\lambda/(n-1)$$

The diffracted light used in this embodiment is 1st-order light. If, however, 2nd-order light is used, the pitch P and the height h can be doubled without changing the power.

As described above, in this embodiment, a compact scanning optical device which is resistant to changes in focus due to environmental variations (temperature changes) and can implement high-resolution printing with a simple arrangement can be obtained by forming the diffraction optical element 8 on the surface of the first optical element 6a of the first and second optical elements 6a and 6b constituting the scanning optical means 6.

In this embodiment, the diffraction optical element 8 is formed on the second surface 6a2 of the first optical element 6a such that the powers based on the diffraction system become different positive (convex) powers in the main scanning direction and the sub-scanning direction. However, a diffraction optical element having a positive power in the main scanning direction and a diffraction optical element having a positive power in the sub-scanning direction may be respectively formed on the surface of the first optical element 6a and the surface of the second optical element 6b. Alternatively, a reverse arrangement to the above arrangement (i.e., a diffraction optical element having a positive power in the sub-scanning direction is formed on the first optical element 6a, whereas a diffraction optical element having a positive power in the main scanning direction is formed on the second optical element 6b) may be used.

Figure 13:
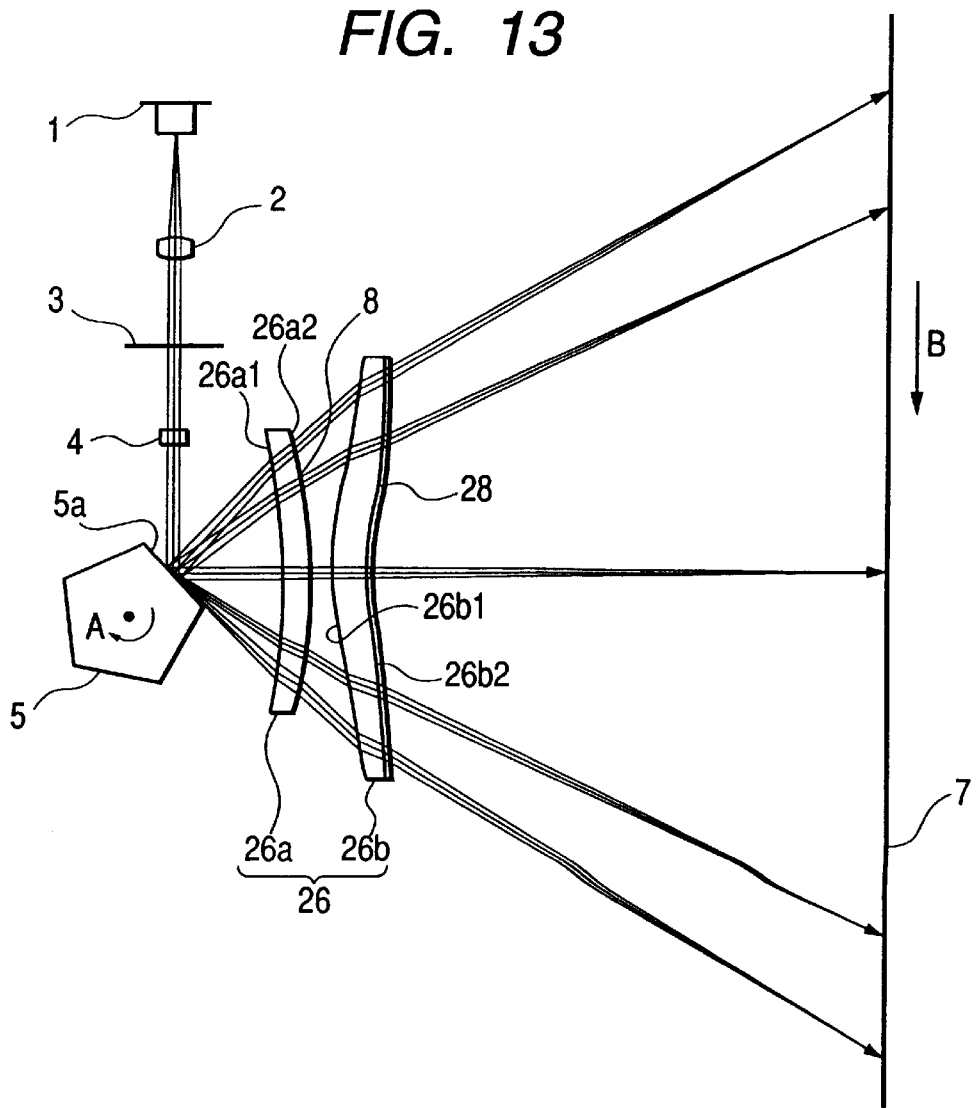
FIG. 13 is a sectional view (main scanning cross-section) of the main part of the second embodiment of the present invention in the main scanning direction.

FIG. 13 is a sectional view (main scanning cross-section) of the main part of a scanning optical device according to the second embodiment of the present invention in the main scanning direction. The same reference numerals in FIG. 13 denote the same parts as in FIG. 3.

This embodiment differs from the first embodiment in that a diffraction optical element is formed on the second optical element surface. The arrangement other than this and optical effects of the second embodiment are almost the same as those of the first embodiment, and hence similar effects are obtained.

Referring to FIG. 13, a scanning optical means 26 has an fθ characteristic and first and second optical elements (fθ lens system) 26a and 26b. The first optical element 26a has a first surface (incident surface) 26a1 and a second surface (exit surface) 26a2, both of which are spherical surfaces exhibiting positive (convex) powers toward the scanned surface side. The second optical element 26b is an anamorphic lens having different positive (convex) powers in the main scanning direction and the sub-scanning direction. Both a first surface (incident surface) 26b1 and a second (exit surface) 26b2 are toric surfaces. In the main scanning direction, both the first and second surfaces 26b1 and 26b2 are aspherical. In the sub-scanning direction, both the first and second surfaces 26b1 and 26b2 continuously change in radius of curvature with distance from the optical axis. A diffraction optical element 28 is formed on the second surface 26b2 such that the powers based on the diffraction system become different positive (convex) powers in the main scanning direction and the sub-scanning direction. Both the first and second optical elements 26a and 26b are made of a plastic material. The scanning optical means 26 has a tilt correction function implemented by setting a deflection surface 5a and a scanned surface 7 optically conjugate with each other within the sub-scanning cross-section.

Figure 14:
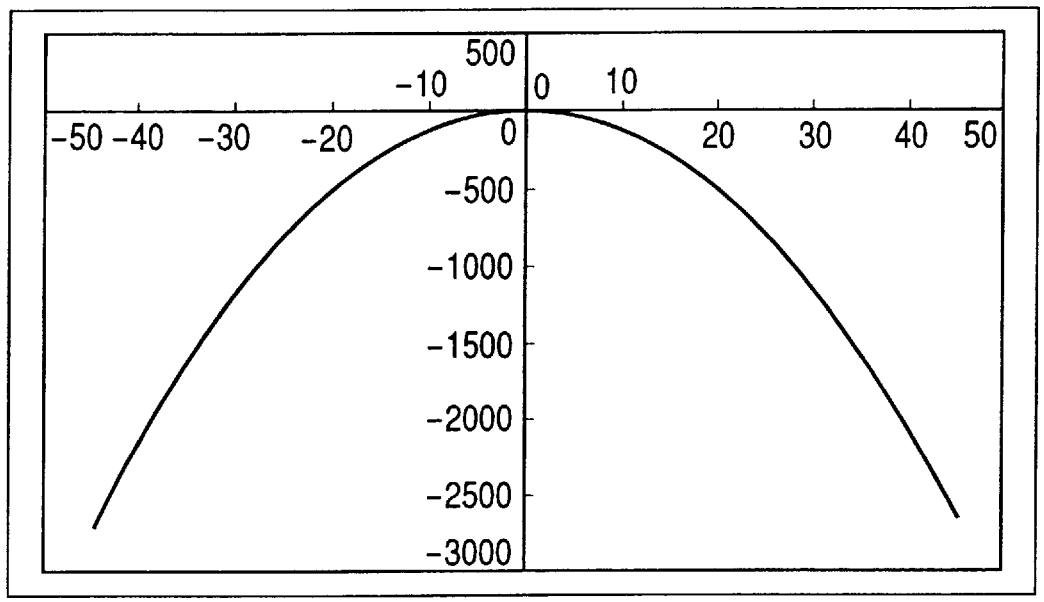
FIG. 14 is a graph showing the phase amount of the diffraction system of the second optical element of the second embodiment of the present invention.
Figure 15:
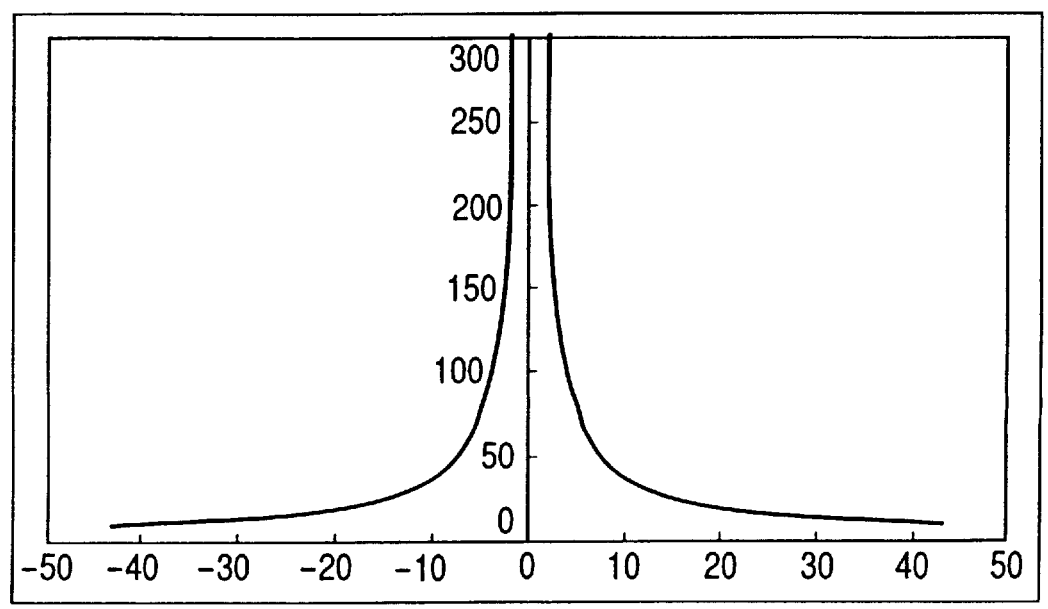
FIG. 15 is a graph showing the pitch of the diffraction grating of the second optical element of the second embodiment of the present invention.
Figure 16:
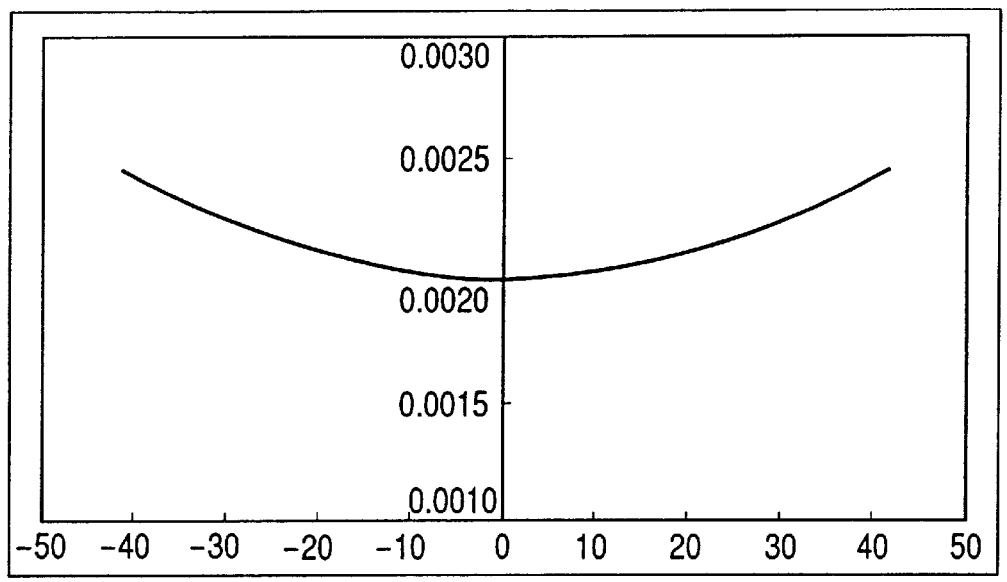
FIG. 16 is a graph showing the diffraction power of the second optical element of the second embodiment of the present invention in the main scanning direction.
Figure 17:
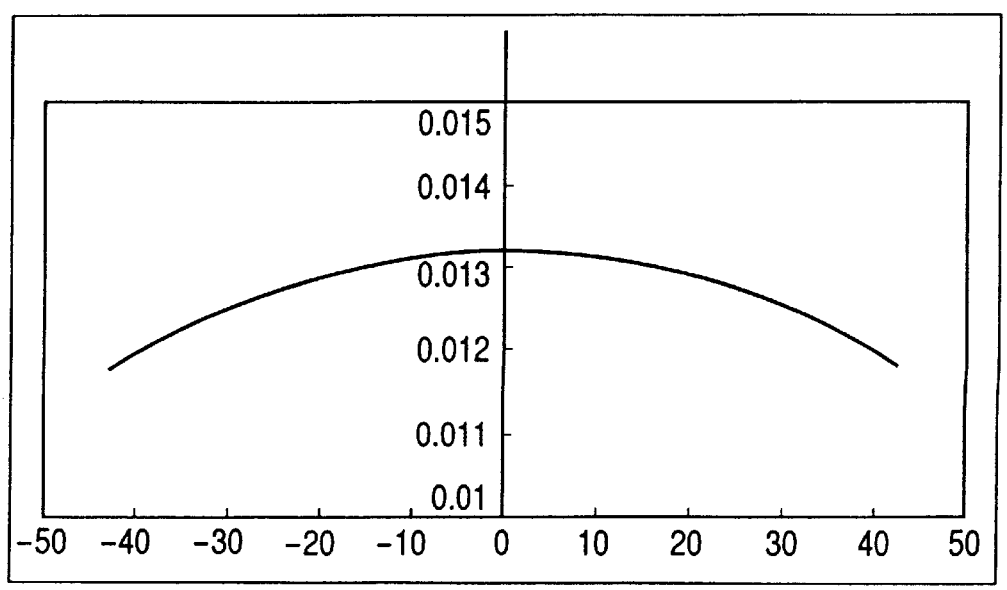
FIG. 17 is a graph showing the diffraction power of the second optical element of the second embodiment of the present invention in the sub-scanning direction.

Table-3 shows an optical configuration in the second embodiment. Table-4 shows the aspherical coefficients of the refraction system and the phase coefficients of the diffraction system. Each of FIGS. 14, 15, 16, and 17 shows the state of the diffraction optical element 28 at the second surface 26b2 of the second optical element 26b. Referring to each drawing, the abscissa represents the Y-axis coordinate on the diffraction optical element 28. FIG. 14 shows the phase amount (unit: λ) within the main scanning cross-section. FIG. 15 shows the pitch (unit: μm) of the diffraction grating with 1st-order diffracted light within the main scanning cross-section. FIG. 16 shows the power in the main scanning direction. FIG. 17 shows the power in the sub-scanning direction.

TABLE 3

| Wavelength Used | λ(nm) | 780 |
|---|---|---|
| Refractive Index of First Optical Element | n1 | 1.5242 |
| Refractive Index of Second Optical Element | n2 | 1.5242 |
| Angle Defined Between Optical Axes of Optical Systems Before and After Deflection Means | θ1(deg) | 90 |
| One-side Maximum Scanning Angle | θmax(deg) | 45 |
| Distance between Deflection Surface and First Optical Element | d1(mm) | 25.00 |
| Central Thickness of First Optical Element | d2(mm) | 5.60 |
| Distance between First and Second Optical Elements | d3(mm) | 5.40 |
| Central thickness of Second Optical Element | d4(mm) | 8.00 |
| Distance between Second Optical | d5(mm) | 113.50 |

TABLE 3-continued

| Wavelength Used | λ(nm) | 780 |
|---|---|---|
| Element and Scanned Surface | | |
| fθ Coefficient | f | 136 |
| Deflection Means (Rotating Polygonal Mirror) | φ20, 4 surfaces | |

TABLE 4

Shape of Refraction System

| | First Optical Element | | Second Optical Element | |
|---|---|---|---|---|
| | First Surface | Second Surface | First Surface | Second Surface |
| R | −126.80 | −118.75 | 50.98 | 61.86 |
| Ku | 0 | 0 | −1.32E + 01 | −1.94E + 01 |
| B4u | 0 | 0 | −1.62E − 06 | −1.84E − 06 |
| B6u | 0 | 0 | 6.14E − 10 | 6.23E − 10 |
| B8u | 0 | 0 | −1.18E − 13 | −1.76E − 13 |
| B10u | 0 | 0 | 2.75E − 17 | 4.39E − 17 |
| K1 | 0 | 0 | −1.32E + 01 | −1.94E + 01 |
| B41 | 0 | 0 | −1.62E − 06 | −1.84E − 06 |
| B61 | 0 | 0 | 6.14E − 10 | 6.23E − 10 |
| B81 | 0 | 0 | −1.18E − 13 | −1.76E − 13 |
| B101 | 0 | 0 | 2.75E − 17 | 4.39E − 17 |
| r | −126.80 | −118.75 | −18.67 | −13.46 |
| D2u | 0 | 0 | 5.06E − 03 | 2.27E − 03 |
| D4u | 0 | 0 | 6.54E − 06 | −8.35E − 07 |
| D6u | 0 | 0 | 2.80E − 09 | −4.22E − 10 |
| D8u | 0 | 0 | −1.12E − 11 | 6.97E − 13 |
| D10u | 0 | 0 | 1.20E − 14 | −2.15E − 16 |
| D21 | 0 | 0 | 5.06E − 03 | 2.27E − 03 |
| D41 | 0 | 0 | 6.54E − 06 | −8.35E − 07 |
| D61 | 0 | 0 | 2.80E − 09 | −4.22E − 10 |
| D81 | 0 | 0 | −1.12E − 11 | 6.97E − 13 |
| D101 | 0 | 0 | 1.20E − 14 | −2.15E − 16 |

Shape of Diffraction System

| | First Optical Element | | Second Optical Element | |
|---|---|---|---|---|
| | First Surface | Second Surface | First Surface | Second Surface |
| C1 | 0 | 0 | 0 | 0 |
| C2 | 0 | 0 | 0 | −1.01E − 03 |
| C3 | 0 | 0 | 0 | 0 |
| C4 | 0 | 0 | 0 | −2.14E − 08 |
| C5 | 0 | 0 | 0 | 0 |
| C6 | 0 | 0 | 0 | 0 |
| C7 | 0 | 0 | 0 | 0 |
| C8 | 0 | 0 | 0 | 0 |
| C9 | 0 | 0 | 0 | 0 |
| C10 | 0 | 0 | 0 | 0 |
| E1 | 0 | 0 | 0 | −6.59E − 03 |
| E2 | 0 | 0 | 0 | 0 |
| E3 | 0 | 0 | 0 | 3.86E − 07 |
| E4 | 0 | 0 | 0 | 0 |
| E5 | 0 | 0 | 0 | 0 |
| E6 | 0 | 0 | 0 | 0 |
| E7 | 0 | 0 | 0 | 0 |
| E8 | 0 | 0 | 0 | 0 |
| E9 | 0 | 0 | 0 | 0 |

As is obvious from FIGS. 16 and 17, in this embodiment, the powers of the diffraction system are set to desired positive (convex) powers in both the main scanning direction and the sub-scanning direction.

In this embodiment, as in the first embodiment, focus changes cancel out each other in the overall scanning optical device to have a temperature compensation effect. In addition, this device has an aspherical effect in the main scanning direction, and contributes to aberration correction by varying the power from on-axis point toward off-axis portion in the sub-scanning direction.

Figure 18:
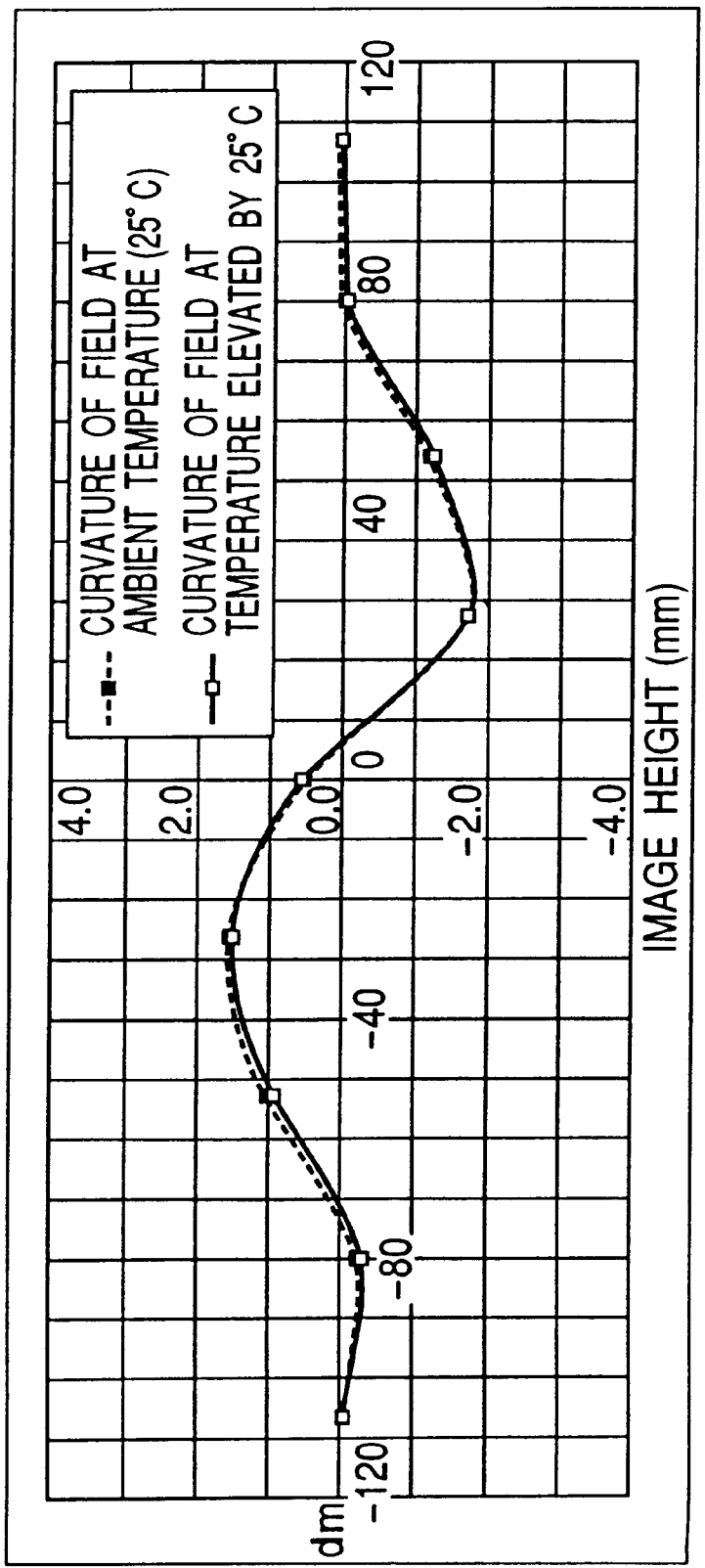
FIG. 18 is a graph showing the curvature of field in the main scanning direction before and after a rise in temperature in the second embodiment of the present invention.
Figure 19:
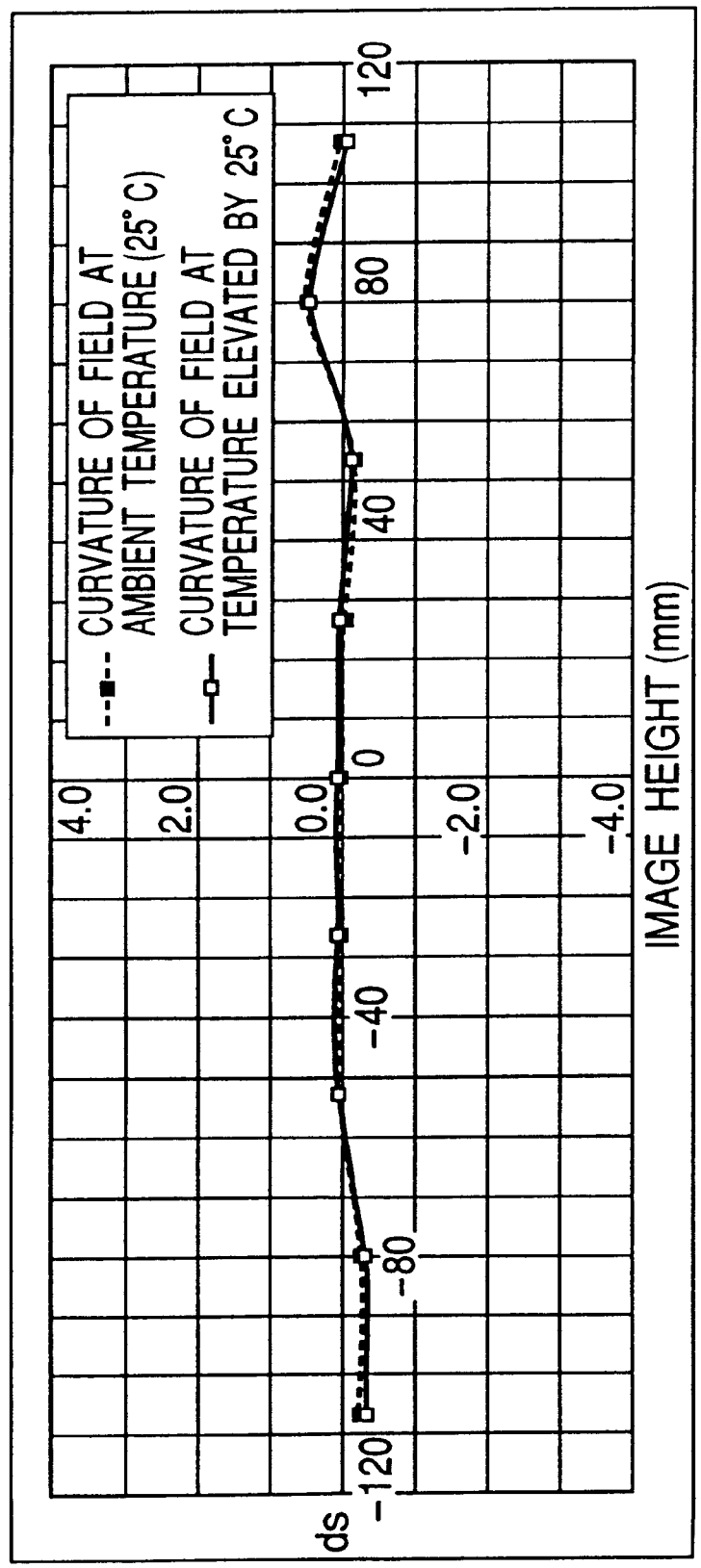
FIG. 19 is a graph showing the curvature of field in the sub-scanning direction before and after a rise in temperature in the second embodiment of the present invention.
Figure 20:
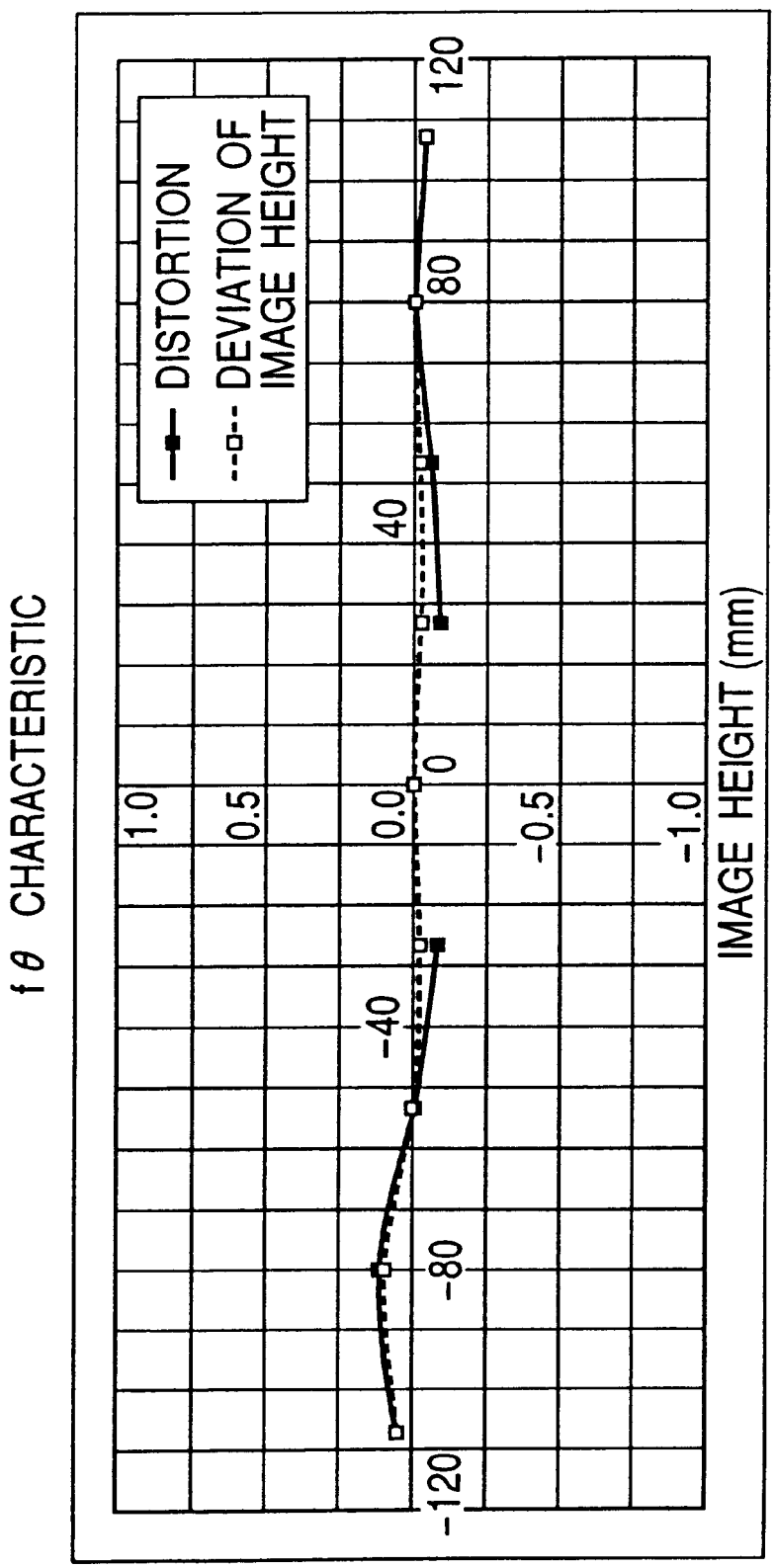
FIG. 20 is a graph showing the distortion (fθ characteristic) and the deviation of image height in the second embodiment of the present invention.

FIG. 18 shows the curvature of field in the main scanning direction before and after a rise in tempera- ture in this embodiment. FIG. 19 shows the curvature of field in the sub-scanning direction before and after the rise in temperature in this embodiment. FIG. 20 shows the distortion (fθ characteristic) and the deviation of image height in this embodiment. Referring to each of FIGS. 18 and 19, the dotted line represents the curvature of field at a room temperature of 25° C.; and the solid line, the curvature of field when the temperatures rises from 25° C. to 50° C. In this case, a refractive index n* of the first and second optical elements 26a and 26b and a wavelength λ* of the light source means 1 are respectively set as:

n*=1.5221

λ*=786.4 nm

As is obvious from FIGS. 18 and 19, the focus shifts both in the main scanning direction and the sub-scanning direction are properly corrected.

Figure 21:
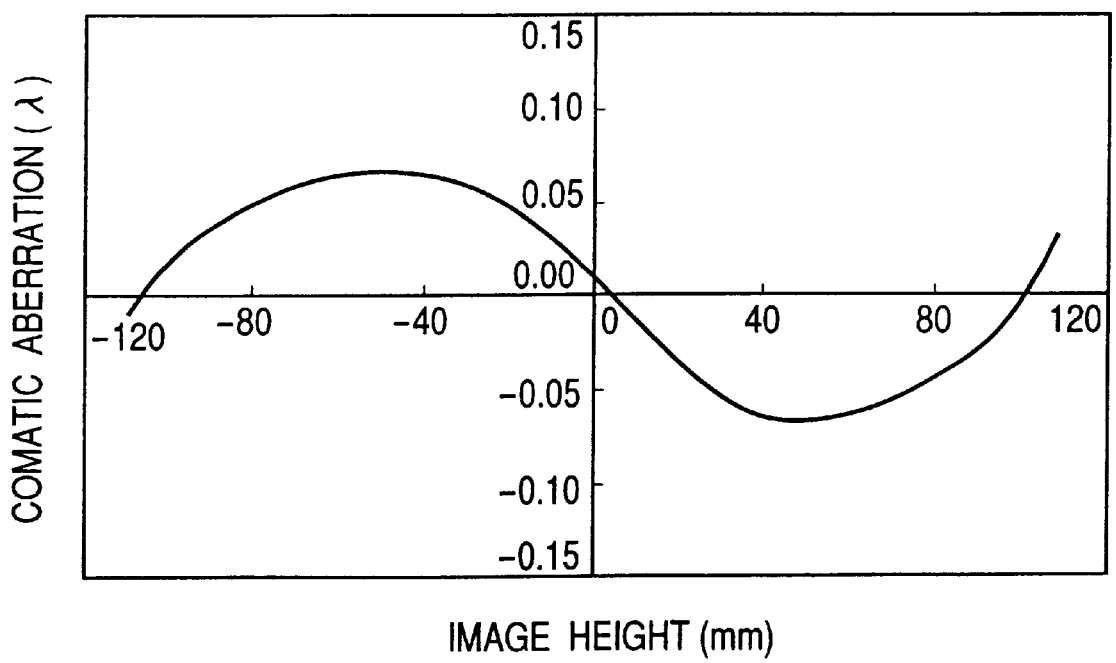
FIG. 21 is a graph showing the comatic aberration in the main scanning direction in the second embodiment of the present invention.

In this embodiment, since the scanning optical means 26 is made up of two lenses, comatic aberration in the main scanning direction can be properly corrected. FIG. 21 shows the comatic aberration (unit: wavelength λ; abscissa: image height) of a full-pupil light beam at each image height with a spot diameter of 80 μm. At the middle image height at which the aberration increases to the maximum value, the aberration is about 0.07 λ. The spot diameter can therefore be further reduced.

In addition, in this embodiment, the diffraction optical element 28 is formed on the second surface 26b2 as the exit side of the second optical element 26b. By forming a diffraction optical element on the second surface, troubles traced back to diffracted light components of orders other than the order used can be reduced.

In this embodiment, the diffraction grating shown in FIG. 12 is a blazed diffraction grating in a sawtooth form. However, a binary diffraction grating formed by a stepped diffraction grating may be used. Letting P be the grating pitch, h be the grating height, and n be the refractive index in FIG. 12, $$h=\lambda/(n-1)$$

The diffracted light used in this embodiment is 1st-order light. If, however, 2nd-order light is used, the pitch P and the height h can be doubled without changing the power.

As described above, in this embodiment, a compact scanning optical device which is resistant to changes in focus due to environmental variations (temperature changes) and can implement high-resolution printing with a simple arrangement can be obtained by forming the diffraction optical element 28 on the surface of the second optical element 26b of the first and second optical elements 26a and 26b constituting the scanning optical means 26.

Figure 22:
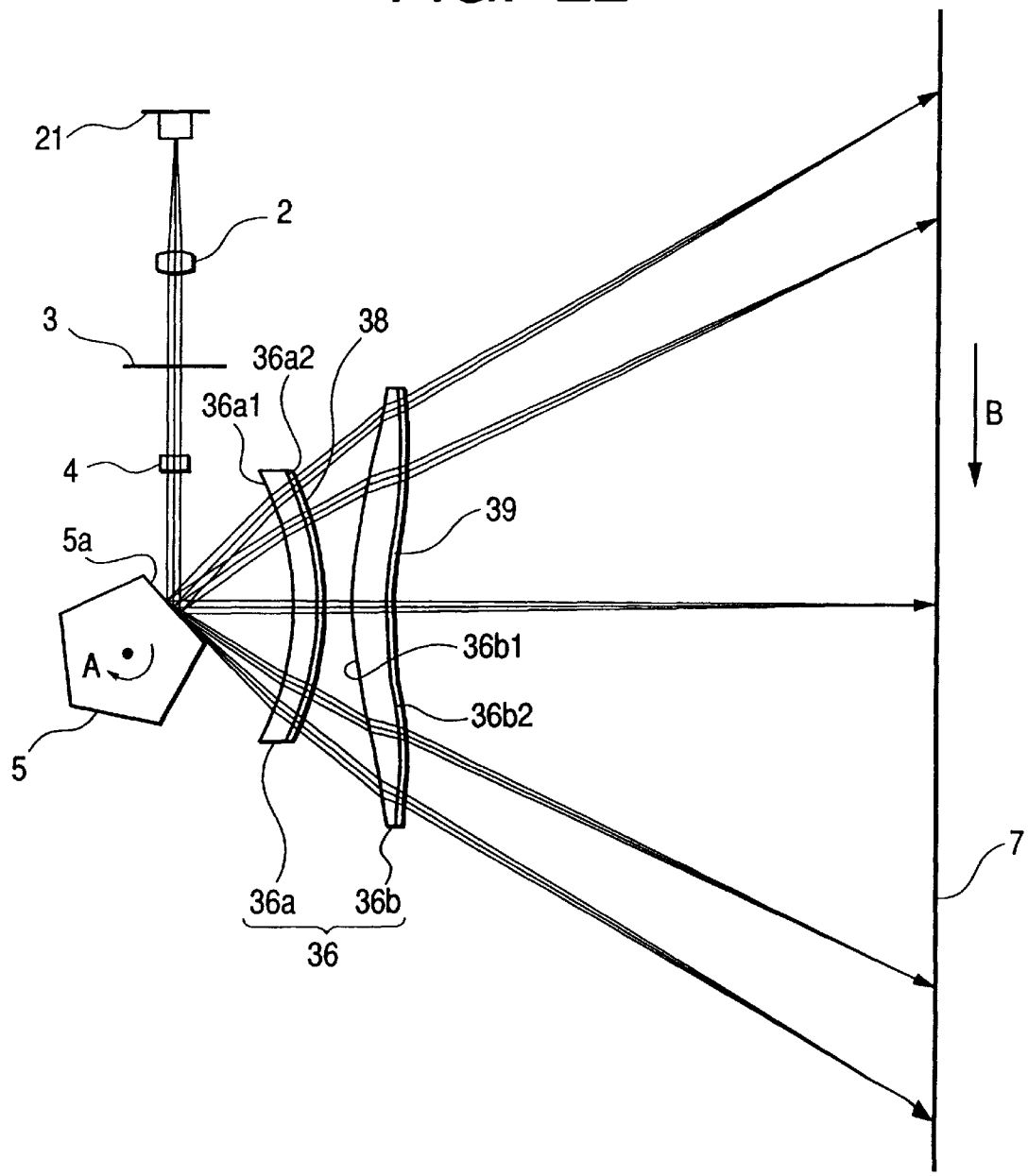
FIG. 22 is a sectional view (main scanning cross-section) of the main part of the third embodiment of the present invention in the main scanning direction.

FIG. 22 is a sectional view (main scanning cross-section) of the main part of a scanning optical device according to the third embodiment of the present invention in the main scanning direction. The same reference numerals in FIG. 22 denote the same parts as in FIG. 3.

Referring to FIG. 22, a light source means 21 has a plurality of light-emitting units (first and second light-emitting units in this embodiment). For example, a multi-semiconductor laser is used as the light source means 21. A scanning optical means 36 has an fθ characteristic and first and second optical elements (fθ lens system) 36a and 36b. The first optical element 36a has a first surface (incident surface) 36a1 and a second surface (exit surface) 36a2, both of which are spherical surfaces exhibiting positive (convex) powers toward the scanned surface side. A diffraction optical element 38 is formed on the second surface 36a2 such that the power based on the diffraction system becomes a positive (convex) power in the sub-scanning direction. The second optical element 36b is an anamorphic lens having different positive (convex) powers in the main scanning direction and the sub-scanning direction. Both a first surface (incident surface) 36b1 and a second (exit surface) 36b2 are toric surfaces. In the main scanning direction, both the first and second surfaces 36b1 and 36b2 are aspherical. In the sub-scanning direction, both the first and second surfaces 36b1 and 36b2 continuously change in radius of curvature with distance from the optical axis. A diffraction optical element 39 is formed on the second surface 36b2 such that the power based on the diffraction system become a positive (convex) power in the main scanning direction. Both the first and second optical elements 36a and 36b are made of a plastic material. The scanning optical means 36 has a tilt correction function implemented by setting a deflection surface 5a and a scanned surface 7 optically conjugate with each other within the sub-scanning cross-section.

In this embodiment, a plurality of divergent light beams emitted from the multi-semiconductor laser 21 are converted into convergent light beams by a collimator lens 2. The light beams are then shaped into desired beam shapes by an aperture stop 3 and strike a cylindrical lens 4. The light beams incident on the cylindrical lens 4 exit without any change within the main scanning cross-section. However, the light beams converge within the sub-scanning cross-section to form substantially linear images (linear images elongated in the main scanning direction) on the deflection surface 5a of a deflection means 5. The light beams reflectively deflected by the deflection surface 5a of the deflection means 5 form spots on the photosensitive drum surface 7 via a scanning optical means 6. By rotating the deflection means 5 in the direction indicated by the arrow A, the light beams are scanned on the photosensitive drum surface 7 at a constant speed in the direction indicated by an arrow B (main scanning direction). With this operation, an image is recorded on the photosensitive drum surface 7 as a recording medium.

Figure 23:
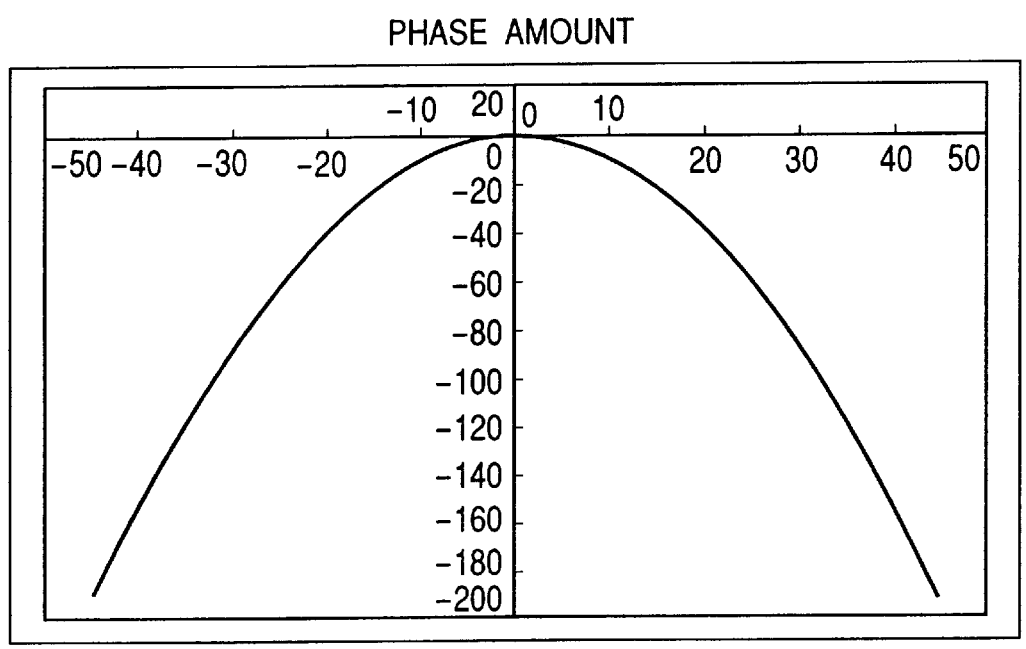
FIG. 23 is a graph showing the phase amount of the diffraction system of the second optical element of the third embodiment of the present invention.
Figure 24:
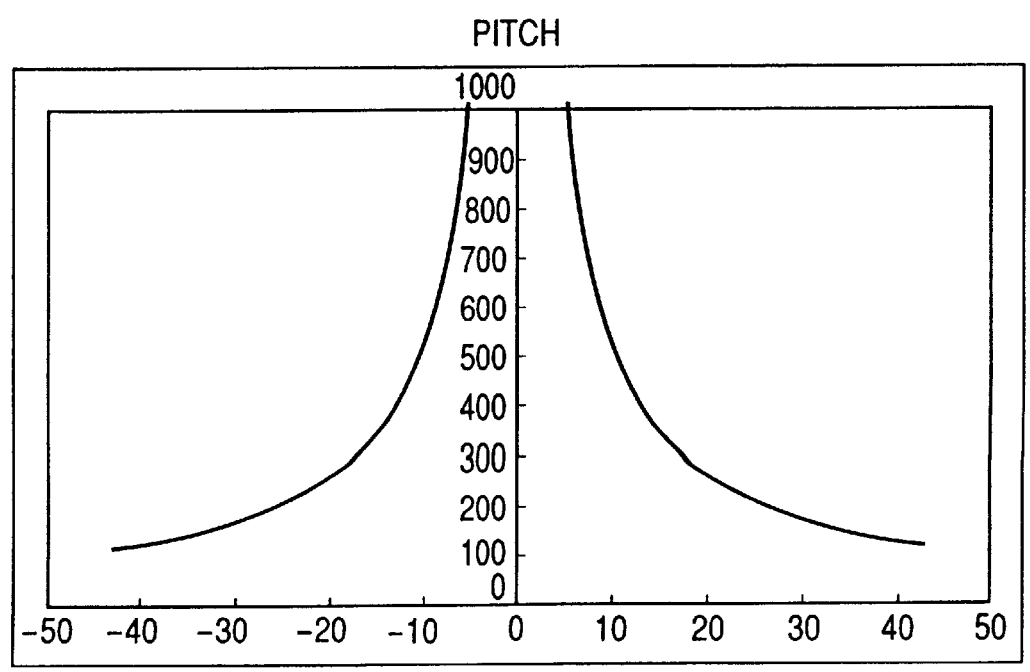
FIG. 24 is a graph showing the pitch of the diffraction grating of the second optical element of the third embodiment of the present invention.
Figure 25:
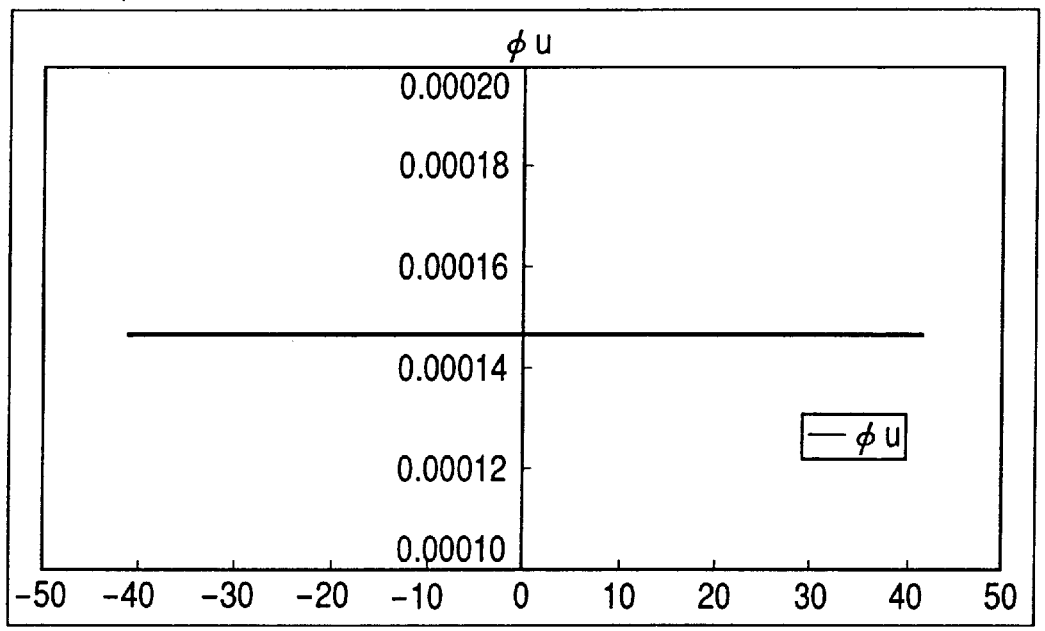
FIG. 25 is a graph showing the diffraction power of the second optical element of the third embodiment of the present invention in the main scanning direction.
Figure 26:
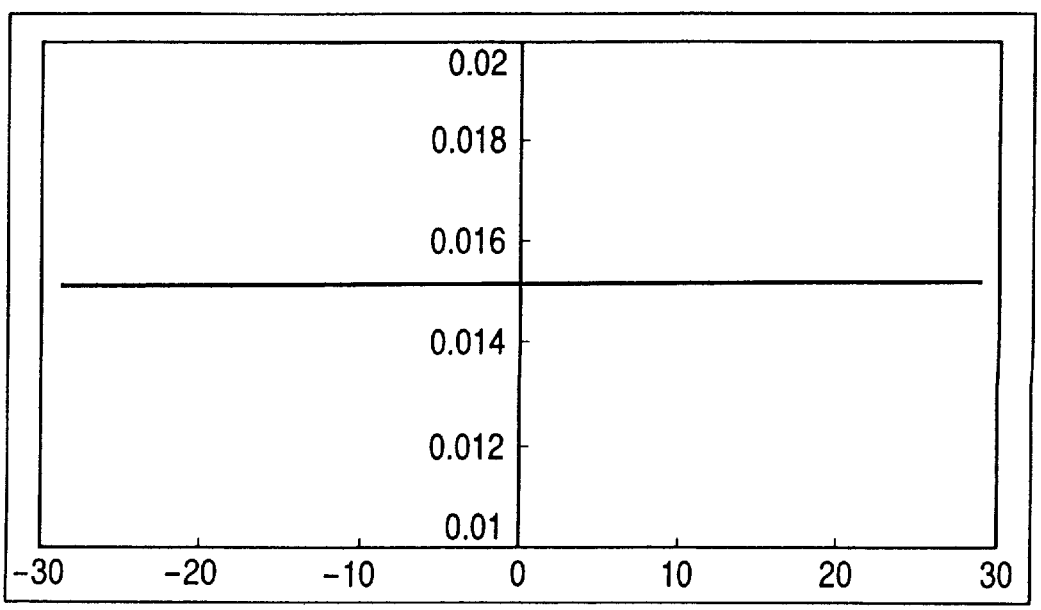
FIG. 26 is a graph showing the diffraction power of the first optical element of the third embodiment of the present invention in the sub-scanning direction.

Table-5 shows an optical configuration in the this embodiment. Table-6 shows the aspherical coefficients of the diffraction system and the phase coefficients of the refraction system. Each of FIGS. 23, 24, and 25 shows the state of the diffraction optical element 39 at the second surface 36b2 of the second optical element 36b. FIG. 26 shows the state of the diffraction optical element at the second surface 36a2 of the first optical element 36a. Referring to each drawing, the abscissa represents the y coordinate on the diffraction optical element. FIG. 23 shows the phase amount (unit: $\lambda$) within the main scanning cross-section. FIG. 24 shows the pitch (unit: $\mu$m) of the diffraction grating with 1st-order diffracted light within the main scanning cross-section. FIG. 25 shows the power in the main scanning direction. FIG. 26 shows the power in the sub-scanning direction.

TABLE 5

| Wavelength Used | $\lambda$(nm) | 780 |
|---|---|---|
| Refractive Index of First Optical Element | n1 | 1.5242 |
| Refractive Index of Second Optical Element | n2 | 1.5242 |

TABLE 5-continued

| Wavelength Used | $\lambda$(nm) | 780 |
|---|---|---|
| Angle Defined Between Optical Axes of Optical Systems Before and After Deflection Means | $\theta$1(deg) | 90 |
| One-side Maximum Scanning Angle | $\theta$max(deg) | 45 |
| Distance between Deflection Surface and First Optical Element | d1(mm) | 25.00 |
| Central Thickness of First Optical Element | d2(mm) | 5.60 |
| Distance between First and Second Optical Elements | d3(mm) | 5.40 |
| Central thickness of Second Optical Element | d4(mm) | 8.00 |
| Distance between Second Optical Element and Scanned Surface | d5(mm) | 113.50 |
| f$\theta$ Coefficient | f | 136 |
| Deflection Means (Rotating Polygonal Mirror) | | $\phi$20, 4 surfaces |

TABLE 6

Shape of Refraction System

| | First Optical Element | | Second Optical Element | |
|---|---|---|---|---|
| | First Surface | Second Surface | First Surface | Second Surface |
| R | −78.80 | −69.51 | 51.72 | 72.08 |
| Ku | 0 | 0 | −1.09E + 01 | −2.41E + 01 |
| B4u | 0 | 0 | −1.44E − 06 | −1.99E − 06 |
| B6u | 0 | 0 | 4.78E − 10 | 4.46E − 10 |
| B8u | 0 | 0 | −2.96E − 14 | −4.12E − 14 |
| B10u | 0 | 0 | 5.67E − 18 | 1.97E − 17 |
| K1 | 0 | 0 | −1.09E + 01 | −2.41E + 01 |
| B41 | 0 | 0 | −1.44E − 06 | −1.99E − 06 |
| B61 | 0 | 0 | 4.78E − 10 | 4.46E − 10 |
| B81 | 0 | 0 | −2.96E − 14 | −4.12E − 14 |
| B101 | 0 | 0 | 5.67E − 18 | 1.97E − 17 |
| r | −78.80 | −69.51 | −80.65 | −18.63 |
| D2u | 0 | 0 | 4.70E − 03 | 1.42E − 03 |
| D4u | 0 | 0 | 2.24E − 05 | −1.16E − 06 |
| D6u | 0 | 0 | −4.17E − 08 | −6.86E − 10 |
| D8u | 0 | 0 | −1.07E − 11 | 1.36E − 12 |
| D10u | 0 | 0 | 2.85E − 14 | −4.43E − 16 |
| D21 | 0 | 0 | 4.70E − 03 | 1.42E − 03 |
| D41 | 0 | 0 | 2.24E − 05 | −1.16E − 06 |
| D61 | 0 | 0 | −4.17E − 08 | −6.86E − 10 |
| D81 | 0 | 0 | −1.07E − 11 | 1.36E − 12 |
| D101 | 0 | 0 | 2.85E − 14 | −4.43E − 16 |

Shape of Diffraction System

| | First Optical Element | | Second Optical Element | |
|---|---|---|---|---|
| | First Surface | Second Surface | First Surface | Second Surface |
| C1 | 0 | 0 | 0 | 0 |
| C2 | 0 | 0 | 0 | −7.46E − 05 |
| C3 | 0 | 0 | 0 | 0 |
| C4 | 0 | 0 | 0 | 0 |
| C5 | 0 | 0 | 0 | 0 |
| C6 | 0 | 0 | 0 | 0 |
| C7 | 0 | 0 | 0 | 0 |
| C8 | 0 | 0 | 0 | 0 |
| C9 | 0 | 0 | 0 | 0 |
| C10 | 0 | 0 | 0 | 0 |
| E1 | 0 | −7.69E − 03 | 0 | 0 |
| E2 | 0 | 0 | 0 | 0 |
| E3 | 0 | 0 | 0 | 0 |
| E4 | 0 | 0 | 0 | 0 |
| E5 | 0 | 0 | 0 | 0 |
| E6 | 0 | 0 | 0 | 0 |
| E7 | 0 | 0 | 0 | 0 |

TABLE 6-continued

| E8 | 0 | 0 | 0 | 0 |
| E9 | 0 | 0 | 0 | 0 |

As is obvious from FIG. 26, in this embodiment, the power of the diffraction system is set to desired positive (convex) power in the sub-scanning direction.

In this embodiment, by setting the power of the diffraction system to the desired positive (convex) power, a focus shift (aberration variation) caused by a change in the refractive index of the lens material of the scanning optical means 36 due to environmental variations can be corrected by a change in diffraction power owing to variations in the wavelength of the light source means 21. More specifically, when the temperature rises, the refractive index of the plastic material decreases, and hence the focal point moves away from the scanning optical means 36. At this time, however, since the wavelength of the light source means 21 as a light source means shifts to the long wave side, the positive (convex) power of the diffraction system increases to change the focal point toward the scanning optical means 36. As a consequence, focus changes cancel out each other in the overall scanning optical device to have a temperature compensation effect.

Figure 27:
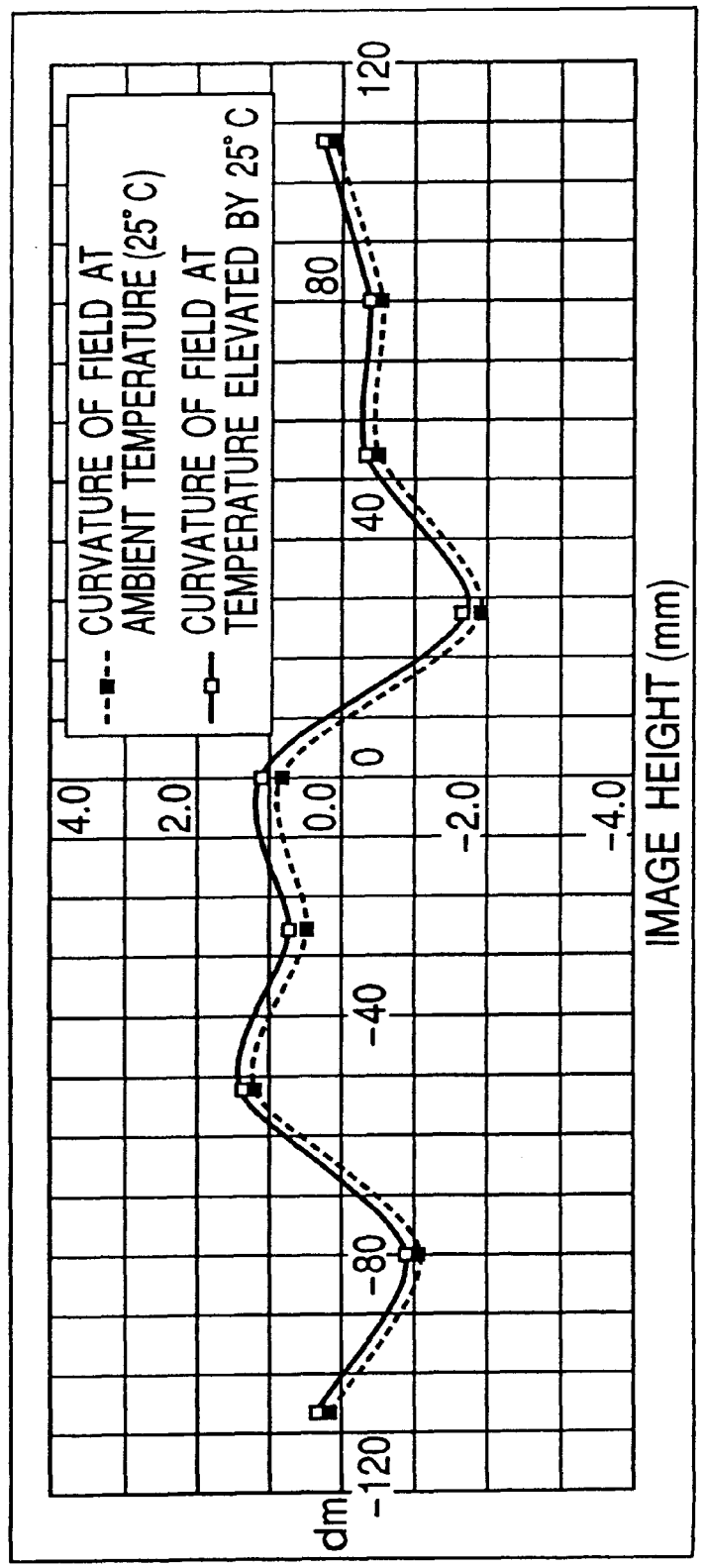
FIG. 27 is a graph showing the curvature of field in the main scanning direction before and after a rise in temperature in the third embodiment of the present invention.
Figure 28:
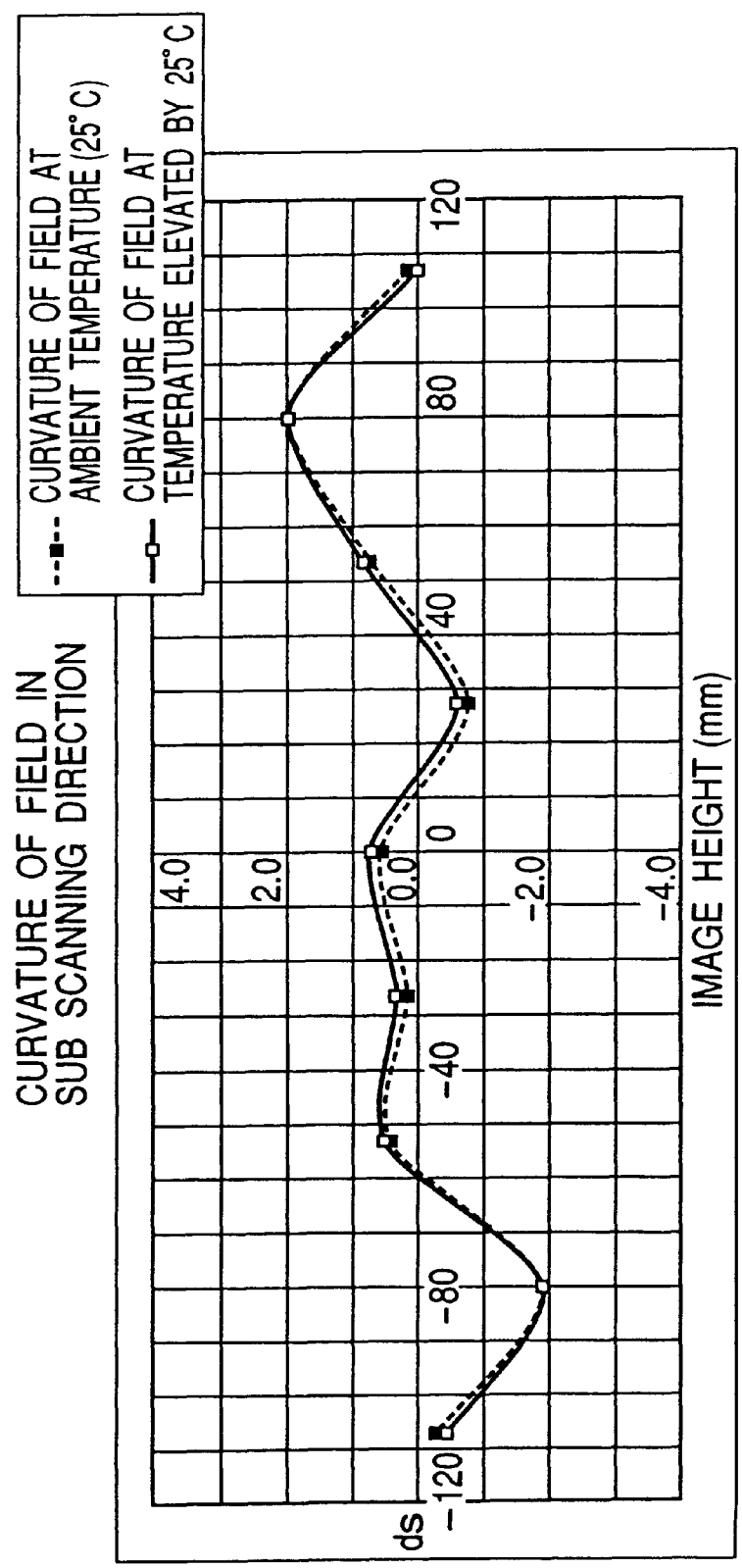
FIG. 28 is a graph showing the curvature of field in the sub-scanning direction before and after a rise in temperature in the third embodiment of the present invention.
Figure 29:
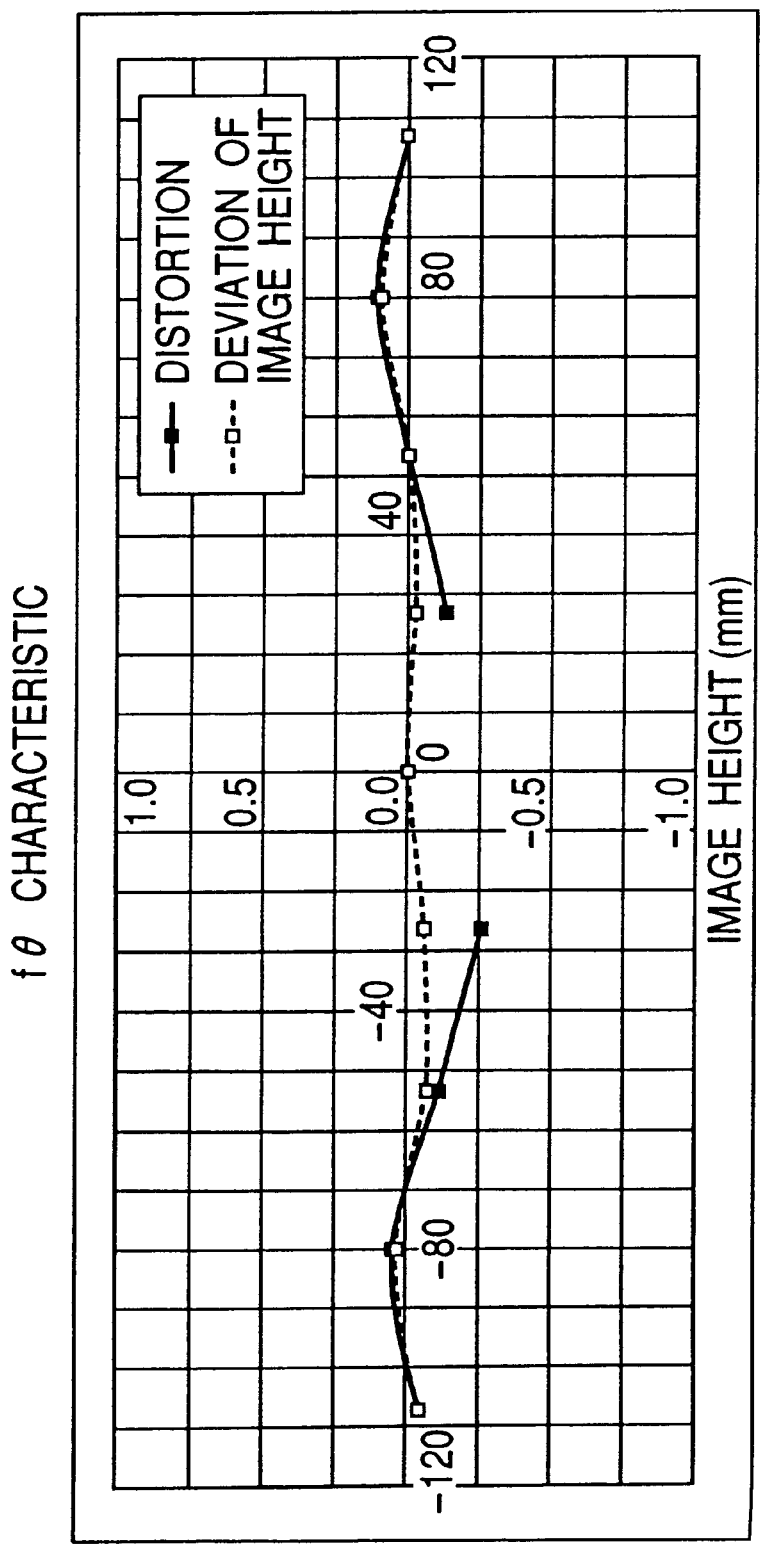
FIG. 29 is a graph showing the distortion (fθ characteristic) and the deviation of image height in the third embodiment of the present invention.

FIG. 27 shows the curvature of field in the main scanning direction before and after a rise in temperature in this embodiment. FIG. 28 shows the curvature of field in the sub-scanning direction before and after the rise in temperature in this embodiment. FIG. 29 shows the distortion (fθ characteristic) and the deviation of image height in this embodiment. Referring to each of FIGS. 27 and 28, the dotted line represents the curvature of field at a room temperature of 25° C.; and the solid line, the curvature of field when the temperatures rises from 25° C. to 50° C. In this case, a refractive index n* of the first and second optical elements 36a and 36b and a wavelength λ* of the light source means 21 are respectively set as:

n*=1.5221
λ*=786.4 nm

As can be seen from FIGS. 27 and 28, the focus shift in the sub-scanning direction is properly corrected.

Figure 30:
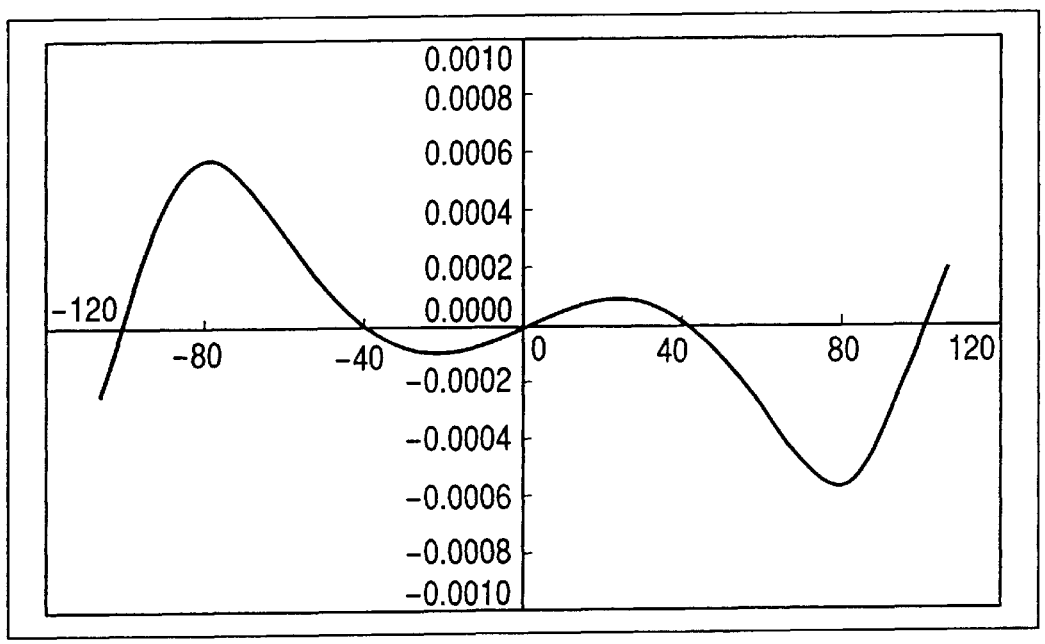
FIG. 30 is a graph showing the chromatic aberration of magnification in the third embodiment of the present invention.

As is obvious from FIG. 25, in this embodiment, to properly correct chromatic aberration of magnification, the power of the diffraction system is desirably set to a weak positive (convex) power in the main scanning direction. FIG. 30 shows the chromatic aberration of magnification in this embodiment. Referring to FIG. 30, the abscissa represents the image height; and the ordinate, the image height difference. In a multi-beam scanning optical device, if, for example, light beams emitted from a light source means having first and second light-emitting units differ in wavelength, an image height difference, chromatic aberration of magnification, and the like occur in the respective light beams. To correct this chromatic aberration, the power of the diffraction system is set to a weak positive (convex) power. In this case, a refractive index n of the first and second optical elements 36a and 36b with respect to the second light-emitting unit and a wavelength λ of the second light-emitting unit are respectively set as:

n**=1.5240
λ**=790.0 nm

As is apparent from FIG. 30, the total scanning width different at the wavelength of each light-emitting unit, i.e., the jitter amount, is 1 μm or less, and hence the chromatic aberration of magnification is properly corrected.

Figure 31:
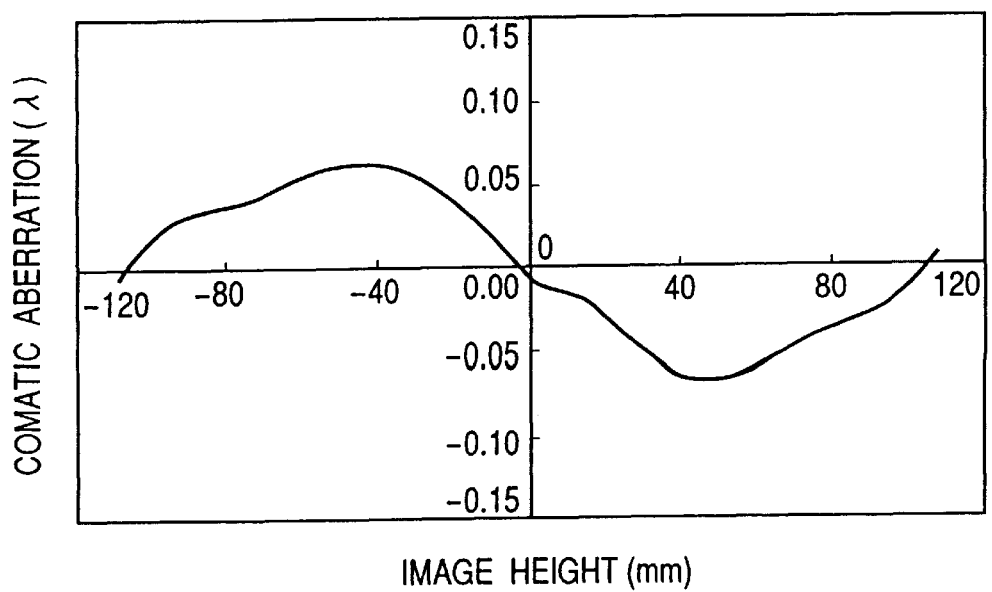
FIG. 31 is a graph showing the comatic aberration in the main scanning direction in the third embodiment of the present invention.

In this embodiment, since the scanning optical means 36 is made up of two lenses, comatic aberration in the main scanning direction can be properly corrected. FIG. 31 shows the comatic aberration (unit: wavelength λ; abscissa: image height) of a full-pupil light beam at each image height with a spot diameter of 80 μm. At the middle image height at which the aberration increases to the maximum value, the aberration is about 0.06 λ. The spot diameter can therefore be further reduced.

In addition, in this embodiment, the diffraction optical element 39 having a power in the main scanning direction is formed on the second surface 36b2 as the exit side of the second optical element 36b. This arrangement aims at suppressing the incident angle (angle θi in FIG. 12) low with respect to the diffraction optical element (diffraction optical surface) within the main scanning cross-section. For example, as the incident angle increases, diffracted light components of orders other than the order used increase in intensity, resulting in a decrease in diffraction efficiency and troubles such as flare due to diffracted light components of orders other than the order used. Such troubles can be reduced by forming a diffraction optical surface on the second surface 36b2.

In this embodiment, the diffraction grating shown in FIG. 12 is a blazed diffraction grating in a sawtooth form. However, a binary diffraction grating formed by a stepped diffraction grating may be used. Letting P be the grating pitch, h be the grating height, and n be the refractive index in FIG. 12, $$h=\lambda/(n-1)$$

The diffracted light used in this embodiment is 1st-order light. If, however, 2nd-order light is used, the pitch P and the height h can be doubled without changing the power.

As described above, in this embodiment, a compact multi-beam scanning optical device which is resistant to changes in focus due to environmental variations (temperature changes) and can implement high-resolution printing with a simple arrangement can be obtained by forming the diffraction optical elements on both the surfaces of the first and second optical elements 36a and 36b constituting the scanning optical means 36.

In this embodiment, the two diffraction optical elements 38 and 39 having different positive powers in the main scanning direction and the sub-scanning direction are respectively formed on the surfaces of the first and second optical elements 36a and 36b. As in the first and second embodiments, however, a diffraction optical element may be formed only on one of the surfaces of the first and second optical elements.

Each embodiment has exemplified the convergence optical system for converting a light beam emitted from the light source means into a light beam convergent within the main scanning cross-section and deflecting it through the deflection means. As evidenced by the foregoing, however, the present invention can be applied to a parallel optical system for converting a light beam emitted from a light source means into a light beam collimated within the main scanning cross-section and deflecting it through a deflection means.

According to the present invention, as described above, in the scanning optical device, the diffraction optical element is formed on the curved surface of at least one of the plurality of optical elements constituting the scanning optical means, thereby realizing a compact scanning optical device which is resistant to focus changes due to environmental variations (temperature changes) and can implement high-resolution printing with a simple arrangement.

In addition, according to the present invention, as described above, in the multi-beam scanning optical device, the diffraction optical element is formed on the curved surface of at least one of the plurality of optical elements constituting the scanning optical means, thereby realizing a compact multi-beam scanning optical device which is resistant to focus changes due to environmental variations (temperature changes) and can implement high-resolution printing with a simple arrangement.

What is claimed is:

1. A scanning optical device comprising:

a light source;

a deflection unit adapted to deflect a light beam emitted from said light source; and a scanning optical unit adapted to form a spot of the light beam deflected by said deflection unit on a surface to be scanned, wherein said scanning optical unit has a plurality of optical elements, and a diffraction optical element is formed on a curved surface of at least one of said optical elements, wherein said diffraction optical element has different positive powers in a main scanning direction and a sub-scanning direction.

2. A device according to claim 1, wherein said diffraction optical element has a positive power in a sub-scanning direction.

3. A device according to claim 1, wherein said diffraction optical element has a positive power in a main scanning direction.

4. A device according to claim 1, wherein said diffraction optical element functions to cancel out an aberration variation in said scanning optical means, caused by an environmental variation in said device, by using a wavelength variation in said light source which is caused by the environmental variation.

5. A device according to claim 1, wherein said diffraction optical element is formed on that surface of said optical element which is located on the scanned surface side.

6. A device according to claim 1, wherein said optical elements comprise a plastic lens.

7. A multi-beam scanning optical device comprising:

a light source having a plurality of light-emitting units;

a deflection unit adapted to deflect a plurality of light beams emitted from said light source; and a scanning optical unit adapted to form spots of the plurality of light beams deflected by said deflection unit on a surface to be scanned, wherein said scanning optical unit has a plurality of optical elements, and a diffraction optical element is formed on a curved surface of at least one of said optical elements, wherein said diffraction optical element has different positive powers in a main scanning direction and a sub-scanning direction.

8. A device according to claim 7, wherein said diffraction optical element has a positive power in a sub-scanning direction.

9. A device according to claim 7, wherein said diffraction optical element has a positive power in a main scanning direction.

10. A device according to claim 7, wherein said diffraction optical element functions to cancel out an aberration variation in said scanning optical unit, caused by an environmental variation in said device, by using a wavelength variation in said light source which is caused by the environmental variation.

11. A device according to claim 7, wherein said diffraction optical element functions to cancel out an aberration variation in said scanning optical unit which is caused by a difference between oscillation wavelengths of said light source having the plurality of light-emitting units.

12. A device according to claim 7, wherein said diffraction optical element is formed on that surface of said optical element which is located on the scanned surface side.

13. A device according to claim 7, wherein said optical elements comprise a plastic lens.

* * * * *